US011937236B2

(12) United States Patent
Liu et al.

(10) Patent No.: US 11,937,236 B2
(45) Date of Patent: Mar. 19, 2024

(54) ACKNOWLEDGMENT FEEDBACK CONFIGURATION FOR GROUP-COMMON DOWNLINK CHANNELS WITH REPETITIONS

(71) Applicant: QUALCOMM Incorporated, San Diego, CA (US)

(72) Inventors: Le Liu, Fremont, CA (US); Kazuki Takeda, Tokyo (JP); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 17/220,787

(22) Filed: Apr. 1, 2021

(65) Prior Publication Data
US 2022/0322397 A1   Oct. 6, 2022

(51) Int. Cl.
*H04W 72/1273*   (2023.01)
*H04L 5/00*   (2006.01)
*H04W 72/21*   (2023.01)

(52) U.S. Cl.
CPC ....... *H04W 72/1273* (2013.01); *H04L 5/0055* (2013.01); *H04W 72/21* (2023.01)

(58) Field of Classification Search
CPC ....... H04L 1/08; H04L 1/1614; H04L 1/1822; H04L 1/1854; H04L 1/1861; H04L 1/1896; H04L 2001/0093; H04L 5/0055; H04W 72/1273; H04W 72/21
See application file for complete search history.

(56) References Cited

U.S. PATENT DOCUMENTS

| 11,817,960 B2 * | 11/2023 | Zhou ................... H04L 1/1854 |
| 11,818,702 B2 * | 11/2023 | Tseng ................... H04W 72/11 |
| 2014/0036806 A1 * | 2/2014 | Chen ................... H04L 5/0035 370/329 |
| 2015/0281912 A1 * | 10/2015 | Cai ................... H04L 1/1671 370/329 |
| 2018/0152274 A1 * | 5/2018 | Li ................... H04L 5/0055 |
| 2020/0112941 A1 * | 4/2020 | Yerramalli ........... H04W 28/04 |
| 2020/0374048 A1 * | 11/2020 | Lei ................... H04L 1/1896 |

(Continued)

OTHER PUBLICATIONS

U.S. Appl. No. 63/155,116, filed 2021.*

*Primary Examiner* — Dung B Huynh
(74) *Attorney, Agent, or Firm* — Holland & Hart LLP

(57) ABSTRACT

Methods, systems, and devices for wireless communications are described. A user equipment (UE) may receive an acknowledgment feedback configuration for providing feedback for semi-persistent scheduling (SPS) downlink shared channels (e.g., SPS group-common physical downlink shared channels (PDSCHs), SPS unicast PDSCHs, etc.). For example, the acknowledgment feedback configuration may include separate resources for transmitting acknowledgment feedback for unicast downlink shared channels and for transmitting acknowledgment feedback for group-common downlink shared channels or may include common resources for transmitting acknowledgment feedback for both unicast downlink shared channels and group-common downlink shared channels. In some examples, the UE may multiplex acknowledgment feedback for a set of group-common downlink shared channels with additional acknowledgment feedback for other downlink channels.

30 Claims, 19 Drawing Sheets

(56) References Cited

U.S. PATENT DOCUMENTS

| | | | |
|---|---|---|---|
| 2021/0160879 A1* | 5/2021 | Lin | H04W 72/0453 |
| 2021/0227570 A1* | 7/2021 | Park | H04L 5/0042 |
| 2021/0243782 A1* | 8/2021 | Miao | H04L 5/0091 |
| 2022/0183032 A1* | 6/2022 | Papasakellariou | H04L 1/1854 |
| 2022/0248436 A1* | 8/2022 | Zhang | H04W 72/1273 |
| 2022/0278809 A1* | 9/2022 | Papasakellariou | H04L 1/1861 |
| 2022/0279454 A1* | 9/2022 | Papasakellariou | H04L 1/1861 |
| 2022/0279538 A1* | 9/2022 | Jung | H04L 5/0044 |
| 2022/0286818 A1* | 9/2022 | Chin | H04W 24/08 |
| 2022/0303892 A1* | 9/2022 | Awadin | H04L 5/0092 |
| 2022/0312318 A1* | 9/2022 | Babaei | H04L 5/0048 |
| 2022/0322313 A1* | 10/2022 | Zhang | H04W 4/06 |
| 2022/0322375 A1* | 10/2022 | Huang | H04W 72/51 |
| 2022/0329390 A1* | 10/2022 | Zhang | H04L 1/1671 |
| 2022/0360950 A1* | 11/2022 | Li | H04L 1/1812 |
| 2022/0361161 A1* | 11/2022 | Wei | H04W 72/046 |
| 2022/0394805 A1* | 12/2022 | Chen | H04W 76/20 |
| 2022/0399978 A1* | 12/2022 | Gao | H04L 5/0055 |
| 2023/0006798 A1* | 1/2023 | Lee | H04L 1/1607 |
| 2023/0041764 A1* | 2/2023 | Park | H04L 5/0053 |
| 2023/0071767 A1* | 3/2023 | Zhou | H04W 72/30 |
| 2023/0096989 A1* | 3/2023 | Lee | H04L 1/1861 370/329 |
| 2023/0137234 A1* | 5/2023 | Park | H04W 72/11 370/329 |
| 2023/0163895 A1* | 5/2023 | Lee | H04L 1/189 370/312 |
| 2023/0179346 A1* | 6/2023 | Gou | H04L 5/0055 714/726 |
| 2023/0217439 A1* | 7/2023 | Zhang | H04W 72/1273 370/329 |
| 2023/0299890 A1* | 9/2023 | Baek | H04W 72/11 370/329 |
| 2023/0309083 A1* | 9/2023 | Tseng | H04L 1/1822 370/312 |
| 2023/0336285 A1* | 10/2023 | Papasakellariou | H04L 1/1864 |
| 2023/0345448 A1* | 10/2023 | Zhang | H04W 72/21 |

\* cited by examiner

ACKNOWLEDGMENT FEEDBACK CONFIGURATION FOR GROUP-COMMON DOWNLINK CHANNELS WITH REPETITIONS

FIELD OF TECHNOLOGY

The following relates to wireless communications, including an acknowledgment feedback configuration for group-common downlink channels with repetitions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some cases, a base station may communicate with multiple UEs at once. For example, the base station may use broadcasted transmissions or multicasted transmissions to convey a same message to the multiple UEs. Rather than specifically configuring the transmissions for each UE, the base station may configure group-common transmissions for the multiple UEs and indicate these configurations to the multiple UEs to enable the multiple UEs to monitor for and receive these group-common transmissions. Efficient techniques are desired to support group-common transmissions

SUMMARY

The described techniques relate to improved methods, systems, devices, and apparatuses that support an acknowledgment feedback configuration for group-common downlink channels with repetitions. Generally, the described techniques provide for a user equipment (UE) to receive an acknowledgment feedback configuration for providing feedback for semi-persistent scheduling (SPS) downlink shared channels (e.g., SPS group-common physical downlink shared channels (PDSCHs), SPS unicast PDSCHs, etc.). For example, the acknowledgment feedback configuration may include separate resources for transmitting acknowledgment feedback for unicast downlink shared channels and for transmitting acknowledgment feedback for group-common downlink shared channels or may include common resources for transmitting acknowledgment feedback for both unicast downlink shared channels and group-common downlink shared channels. In some examples, the UE may multiplex acknowledgment feedback for a set of group-common downlink shared channels with additional acknowledgment feedback for other downlink channels.

A method for wireless communications at a UE is described. The method may include receiving, from a base station, an acknowledgment feedback configuration for providing feedback for a set of multiple downlink shared channels configured for SPS, the set of multiple downlink shared channels configured for SPS including one or more sets of unicast semi-persistent downlink shared channels and one or more sets of group-common semi-persistent downlink shared channels, the acknowledgment feedback configuration including either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels, monitoring for at least a first set of group-common semi-persistent downlink shared channels of the set of multiple downlink shared channels configured for SPS, and transmitting, to the base station and in accordance with the acknowledgment feedback configuration, an acknowledgment feedback message for at least the first set of group-common semi-persistent downlink shared channels based on the monitoring.

An apparatus for wireless communications at a UE is described. The apparatus may include a processor, memory coupled with the processor, and instructions stored in the memory. The instructions may be executable by the processor to cause the apparatus to receive, from a base station, an acknowledgment feedback configuration for providing feedback for a set of multiple downlink shared channels configured for SPS, the set of multiple downlink shared channels configured for SPS including one or more sets of unicast semi-persistent downlink shared channels and one or more sets of group-common semi-persistent downlink shared channels, the acknowledgment feedback configuration including either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels, monitor for at least a first set of group-common semi-persistent downlink shared channels of the set of multiple downlink shared channels configured for SPS, and transmit, to the base station and in accordance with the acknowledgment feedback configuration, an acknowledgment feedback message for at least the first set of group-common semi-persistent downlink shared channels based on the monitoring.

Another apparatus for wireless communications at a UE is described. The apparatus may include means for receiving, from a base station, an acknowledgment feedback configuration for providing feedback for a set of multiple downlink shared channels configured for SPS, the set of multiple downlink shared channels configured for SPS including one or more sets of unicast semi-persistent downlink shared channels and one or more sets of group-common semi-persistent downlink shared channels, the acknowledgment feedback configuration including either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels, means for monitoring for at least a first set of group-common semi-persistent downlink shared channels of the set of multiple downlink shared channels configured for SPS, and means for transmitting, to the base station and in accordance with the acknowledgment feedback configuration, an acknowledgment feedback message for at least the first set of group-common semi-persistent downlink shared channels based on the monitoring.

A non-transitory computer-readable medium storing code for wireless communications at a UE is described. The code may include instructions executable by a processor to receive, from a base station, an acknowledgment feedback configuration for providing feedback for a set of multiple downlink shared channels configured for SPS, the set of multiple downlink shared channels configured for SPS including one or more sets of unicast semi-persistent downlink shared channels and one or more sets of group-common semi-persistent downlink shared channels, the acknowledgment feedback configuration including either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels, monitor for at least a first set of group-common semi-persistent downlink shared channels of the set of multiple downlink shared channels configured for SPS, and transmit, to the base station and in accordance with the acknowledgment feedback configuration, an acknowledgment feedback message for at least the first set of group-common semi-persistent downlink shared channels based on the monitoring.

In some examples of the method, apparatuses, and non-transitory computer-readable medium described herein, receiving the acknowledgment feedback configuration may include operations, features, means, or instructions for receiving a first list of uplink control channel resources for transmitting acknowledgment feedback for the one or more sets of unicast semi-persistent downlink shared channels and receiving a second list of uplink control channel resources for transmitting acknowledgment feedback for the one or more sets of group-common semi-persistent downlink shared channels, the second list being different than the first list.

Some examples of the method, apparatuses, and non-transitory computer-readable medium described herein may further include operations, features, means, or instructions for determining a first uplink control channel resource from the second list to transmit the acknowledgment feedback message based on a payload size of the acknowledgment feedback message.

In some examples of the method, apparatuses, and non-transitory computer-readable medium described herein, receiving the acknowledgment feedback configuration may include operations, features, means, or instructions for receiving a common list of uplink control channel resources for transmitting acknowledgment feedback for the one or more sets of unicast semi-persistent downlink shared channels and for the one or more sets of group-common semi-persistent downlink shared channels.

Some examples of the method, apparatuses, and non-transitory computer-readable medium described herein may further include operations, features, means, or instructions for determining a first uplink control channel resource from the common list to transmit the acknowledgment feedback message based on a payload size of the acknowledgment feedback message.

In some examples of the method, apparatuses, and non-transitory computer-readable medium described herein, a size of the common list may be different than a size of a list of uplink control channel resources configured for transmitting acknowledgment feedback for the one or more sets of unicast semi-persistent downlink shared channels.

Some examples of the method, apparatuses, and non-transitory computer-readable medium described herein may further include operations, features, means, or instructions for determining a number of bits to transmit in the acknowledgment feedback message based on whether acknowledgment feedback for a dynamic downlink shared channel may be to be transmitted at a same time as the acknowledgment feedback message for one or more semi-persistent downlink shared channels.

Some examples of the method, apparatuses, and non-transitory computer-readable medium described herein may further include operations, features, means, or instructions for determining an acknowledgment codebook for transmitting the acknowledgment feedback message based on a first order of slots per configuration index of the one or more sets of group-common semi-persistent downlink shared channels in a same serving cell, a second order of configuration indexes of the one or more sets of group-common semi-persistent downlink shared channels in a same serving cell, a third order of serving cell indexes, or a combination thereof.

In some examples of the method, apparatuses, and non-transitory computer-readable medium described herein, transmitting the acknowledgment feedback message may include operations, features, means, or instructions for transmitting the acknowledgment feedback message based on multiplexing acknowledgment feedback for at least the first set of group-common semi-persistent downlink shared channels with one or more acknowledgment feedback indications for respective downlink shared channels.

In some examples of the method, apparatuses, and non-transitory computer-readable medium described herein, the acknowledgment feedback for at least the first set of group-common semi-persistent downlink shared channels may be appended after the one or more acknowledgment feedback indications in the acknowledgment feedback message.

In some examples of the method, apparatuses, and non-transitory computer-readable medium described herein, the one or more acknowledgment feedback indications for respective downlink shared channels include acknowledgment feedback for a dynamic group-common downlink shared channel, for a first release message to release a configuration for a set of semi-persistent group-common downlink shared channels, for a set of unicast downlink shared channel, for a unicast dynamic downlink shared channel, for a second release message to release a set of downlink shared channels, or a combination thereof.

Some examples of the method, apparatuses, and non-transitory computer-readable medium described herein may further include operations, features, means, or instructions for determining a hybrid automatic repeat request (HARQ) process identifier (ID) for transmitting the acknowledgment feedback message for at least the first set of group-common semi-persistent downlink shared channels based on a set of parameters configured for a SPS configuration corresponding to the first set of group-common semi-persistent downlink shared channels.

In some examples of the method, apparatuses, and non-transitory computer-readable medium described herein, the set of parameters includes a configured scheduling radio network temporary identifier (CS-RNTI), a periodicity, a number of HARQ processes, a HARQ process ID offset, or a combination thereof, configured for the SPS configuration.

In some examples of the method, apparatuses, and non-transitory computer-readable medium described herein, the set of parameters may be determined based on a group radio network temporary identifier (G-RNTI) configured for a group of UEs including the UE.

In some examples of the method, apparatuses, and non-transitory computer-readable medium described herein, receiving the acknowledgment feedback configuration may include operations, features, means, or instructions for receiving a configuration for transmitting either acknowledgment feedback for a set of unicast semi-persistent downlink shared channels or acknowledgment feedback for a set of group-common semi-persistent downlink shared channels in a same uplink control channel.

In some examples of the method, apparatuses, and non-transitory computer-readable medium described herein, receiving the acknowledgment feedback configuration may include operations, features, means, or instructions for receiving a dropping configuration for dropping a first acknowledgment feedback message for a set of unicast semi-persistent downlink shared channels or a second acknowledgment feedback message for a set of group-common semi-persistent downlink shared channels based on the first acknowledgment feedback message and the second acknowledgment feedback message overlapping in a same transmission time interval (TTI).

In some examples of the method, apparatuses, and non-transitory computer-readable medium described herein, receiving the acknowledgment feedback configuration may include operations, features, means, or instructions for receiving a multiplexing configuration for multiplexing acknowledgment feedback for the one or more sets of unicast semi-persistent downlink shared channels and for the one or more sets of group-common semi-persistent downlink shared channels in a same uplink control channel.

A method for wireless communications at a base station is described. The method may include transmitting, to one or more UEs, an acknowledgment feedback configuration for providing feedback for a set of multiple downlink shared channels configured for SPS, the set of multiple downlink shared channels configured for SPS including one or more sets of unicast semi-persistent downlink shared channels and one or more sets of group-common semi-persistent downlink shared channels, the acknowledgment feedback configuration including either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels, transmitting, to at least a first UE of the one or more UEs, at least a first set of group-common semi-persistent downlink shared channels of the set of multiple downlink shared channels configured for SPS, and receiving, from at least the first UE according to the acknowledgment feedback configuration, an acknowledgment feedback message for at least the first set of group-common semi-persistent downlink shared channels based on the transmitting at least the first set of group-common semi-persistent downlink shared channels.

An apparatus for wireless communications at a base station is described. The apparatus may include a processor, memory coupled with the processor, and instructions stored in the memory. The instructions may be executable by the processor to cause the apparatus to transmit, to one or more UEs, an acknowledgment feedback configuration for providing feedback for a set of multiple downlink shared channels configured for SPS, the set of multiple downlink shared channels configured for SPS including one or more sets of unicast semi-persistent downlink shared channels and one or more sets of group-common semi-persistent downlink shared channels, the acknowledgment feedback configuration including either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels, transmit, to at least a first UE of the one or more UEs, at least a first set of group-common semi-persistent downlink shared channels of the set of multiple downlink shared channels configured for SPS, and receive, from at least the first UE according to the acknowledgment feedback configuration, an acknowledgment feedback message for at least the first set of group-common semi-persistent downlink shared channels based on the transmitting at least the first set of group-common semi-persistent downlink shared channels.

Another apparatus for wireless communications at a base station is described. The apparatus may include means for transmitting, to one or more UEs, an acknowledgment feedback configuration for providing feedback for a set of multiple downlink shared channels configured for SPS, the set of multiple downlink shared channels configured for SPS including one or more sets of unicast semi-persistent downlink shared channels and one or more sets of group-common semi-persistent downlink shared channels, the acknowledgment feedback configuration including either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels, means for transmitting, to at least a first UE of the one or more UEs, at least a first set of group-common semi-persistent downlink shared channels of the set of multiple downlink shared channels configured for SPS, and means for receiving, from at least the first UE according to the acknowledgment feedback configuration, an acknowledgment feedback message for at least the first set of group-common semi-persistent downlink shared channels based on the transmitting at least the first set of group-common semi-persistent downlink shared channels.

A non-transitory computer-readable medium storing code for wireless communications at a base station is described. The code may include instructions executable by a processor to transmit, to one or more UEs, an acknowledgment feedback configuration for providing feedback for a set of multiple downlink shared channels configured for SPS, the set of multiple downlink shared channels configured for SPS including one or more sets of unicast semi-persistent downlink shared channels and one or more sets of group-common semi-persistent downlink shared channels, the acknowledgment feedback configuration including either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels, transmit, to at least a first UE of the one or more UEs, at least a first set of group-common semi-persistent downlink shared channels of the set of multiple downlink shared channels configured for SPS, and receive, from at least the first UE according to the acknowledgment feedback configuration, an acknowledgment feedback message for at least the first set of group-common semi-persistent downlink shared channels based on the transmitting at least the first set of group-common semi-persistent downlink shared channels.

In some examples of the method, apparatuses, and non-transitory computer-readable medium described herein, transmitting the acknowledgment feedback configuration may include operations, features, means, or instructions for transmitting a first list of uplink control channel resources for the one or more UEs to transmit acknowledgment feedback for the one or more sets of unicast semi-persistent downlink shared channels and transmitting a second list of uplink control channel resources for the one or more UEs to transmit acknowledgment feedback for the one or more sets of group-common semi-persistent downlink shared channels, the second list being different than the first list.

In some examples of the method, apparatuses, and non-transitory computer-readable medium described herein, receiving the acknowledgment feedback message may include operations, features, means, or instructions for receiving the acknowledgment feedback message via a first uplink control channel resource from the second list based on a payload size of the acknowledgment feedback message.

In some examples of the method, apparatuses, and non-transitory computer-readable medium described herein, transmitting the acknowledgment feedback configuration may include operations, features, means, or instructions for transmitting a common list of uplink control channel resources for the one or more UEs to transmit acknowledgment feedback for the one or more sets of unicast semi-persistent downlink shared channels and for the one or more sets of group-common semi-persistent downlink shared channels.

In some examples of the method, apparatuses, and non-transitory computer-readable medium described herein, receiving the acknowledgment feedback message may include operations, features, means, or instructions for receiving the acknowledgment feedback message via a first uplink control channel resource from the common list based on a payload size of the acknowledgment feedback message.

In some examples of the method, apparatuses, and non-transitory computer-readable medium described herein, a size of the common list may be different than a size of a list of uplink control channel resources configured for transmitting acknowledgment feedback for the one or more sets of unicast semi-persistent downlink shared channels.

In some examples of the method, apparatuses, and non-transitory computer-readable medium described herein, receiving the acknowledgment feedback message may include operations, features, means, or instructions for receiving the acknowledgment feedback message including a number of bits based on whether acknowledgment feedback for a dynamic downlink shared channel may be received with the acknowledgment feedback message.

In some examples of the method, apparatuses, and non-transitory computer-readable medium described herein, receiving the acknowledgment feedback message may include operations, features, means, or instructions for receiving the acknowledgment feedback message according to an acknowledgment codebook that may be based on an first order of slots per configuration index of the one or more sets of group-common semi-persistent downlink shared channels in a same serving cell, a second order of configuration indexes of the one or more sets of group-common semi-persistent downlink shared channels in a same serving cell, a third order of serving cell indexes, or a combination thereof.

In some examples of the method, apparatuses, and non-transitory computer-readable medium described herein, receiving the acknowledgment feedback message may include operations, features, means, or instructions for receiving the acknowledgment feedback message based on acknowledgment feedback for at least the first set of group-common semi-persistent downlink shared channels being multiplexed with one or more acknowledgment feedback indications for respective downlink shared channels.

In some examples of the method, apparatuses, and non-transitory computer-readable medium described herein, the acknowledgment feedback for at least the first set of group-common semi-persistent downlink shared channels may be appended after the one or more acknowledgment feedback indications in the acknowledgment feedback message.

In some examples of the method, apparatuses, and non-transitory computer-readable medium described herein, the one or more acknowledgment feedback indications for respective downlink shared channels include acknowledgment feedback for a dynamic group-common downlink shared channel, for a first release message to release a configuration for a set of semi-persistent group-common downlink shared channels, for a set of unicast downlink shared channel, for a unicast dynamic downlink shared channel, for a second release message to release a set of downlink shared channels, or a combination thereof.

In some examples of the method, apparatuses, and non-transitory computer-readable medium described herein, receiving the acknowledgment feedback message may include operations, features, means, or instructions for receiving the acknowledgment feedback message based on a HARQ process ID for at least the first set of group-common semi-persistent downlink shared channels that may be based on a set of parameters configured for a SPS configuration corresponding to the first set of group-common semi-persistent downlink shared channels.

In some examples of the method, apparatuses, and non-transitory computer-readable medium described herein, the set of parameters includes a CS-RNTI, a periodicity, a number of HARQ processes, a HARQ process ID offset, or a combination thereof, configured for the SPS configuration.

In some examples of the method, apparatuses, and non-transitory computer-readable medium described herein, the set of parameters may be based on a G-RNTI configured for the one or more UEs.

In some examples of the method, apparatuses, and non-transitory computer-readable medium described herein, transmitting the acknowledgment feedback configuration may include operations, features, means, or instructions for transmitting a configuration for the set of multiple UEs to transmit either acknowledgment feedback for a set of unicast semi-persistent downlink shared channels or acknowledgment feedback for a set of group-common semi-persistent downlink shared channels in a same uplink control channel.

In some examples of the method, apparatuses, and non-transitory computer-readable medium described herein, transmitting the acknowledgment feedback configuration may include operations, features, means, or instructions for transmitting a dropping configuration for the set of multiple UEs to drop a first acknowledgment feedback message for a set of unicast semi-persistent downlink shared channels or a second acknowledgment feedback message for a set of group-common semi-persistent downlink shared channels based on the first acknowledgment feedback message and the second acknowledgment feedback message overlapping in a same transmission time interval.

In some examples of the method, apparatuses, and non-transitory computer-readable medium described herein, transmitting the acknowledgment feedback configuration may include operations, features, means, or instructions for transmitting a multiplexing configuration for the set of multiple UEs to multiplex acknowledgment feedback for the one or more sets of unicast semi-persistent downlink shared channels and for the one or more sets of group-common semi-persistent downlink shared channels in a same uplink control channel.

DETAILED DESCRIPTION

Figure 1:
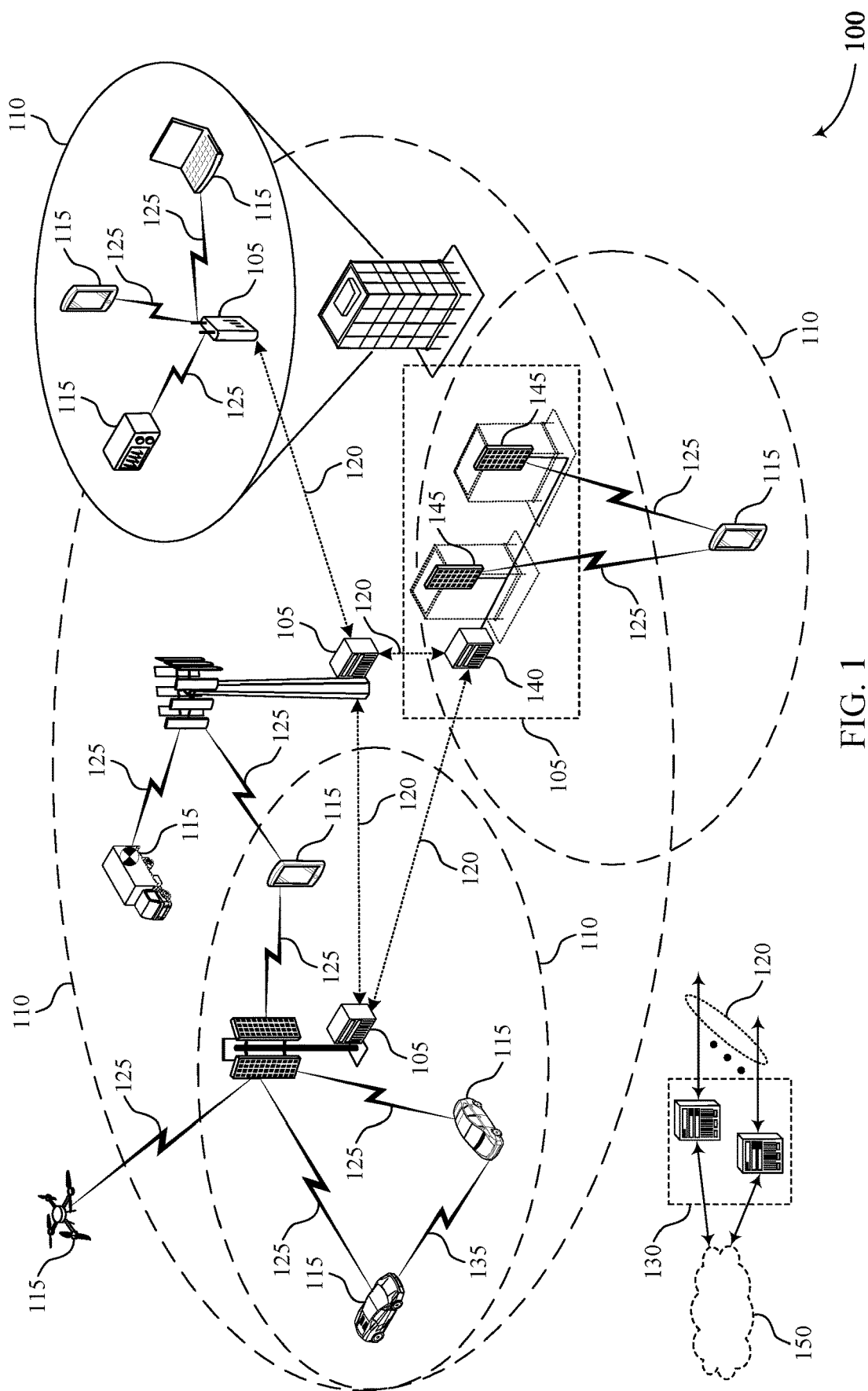
FIG. 1 illustrates an example of a wireless communications system that supports an acknowledgment feedback configuration for group-common downlink channels with repetitions in accordance with aspects of the present disclosure.

For unicast communications, wireless devices (e.g., UEs and base stations) may support one or more hybrid automatic repeat request (HARQ) acknowledgement (ACK) feedback configurations for indicating whether downlink signaling is successfully received at the wireless devices or not. For example, a base station may configure a UE to transmit HARQ ACK feedback to indicate whether a unicast downlink channel (e.g., unicast physical downlink shared channel (PDSCH)) is successfully received or not. In some cases, a wireless device (e.g., a UE or a base station) may not support HARQ ACK feedback for multicast semi-persistent scheduling (SPS) PDSCH signaling, or HARQ ACK configurations for multicast SPS downlink signaling has yet to be defined.

As described herein, a UE and a base station may support HARQ ACK feedback configurations for SPS PDSCH signaling that is unicast, broadcast, multicast, or a combination thereof. In some cases, the base station may configure separate or common SPS physical uplink control channel (PUCCH) resource lists for transmitting the HARQ ACK feedback, where the separate or common lists are configured for SPS group-common (e.g., multicast/broadcast) PDSCHs and for SPS unicast PDSCHs. For example, the base station may configure a first SPS PUCCH resource list for transmitting HARQ ACK feedback for the SPS group-common PDSCHs and a second SPS PUCCH resource list for transmitting HARQ ACK feedback for the SPS unicast PDSCHs (e.g., to avoid collisions between unicast and multicast PUCCH signals). Additionally or alternatively, the base station may configure a common SPS PUCCH resource list for HARQ ACK feedback for both the SPS group-common PDSCHs and the SPS unicast PDSCHs (e.g., to avoid additional signaling overhead resulting from signaling separate SPS PUCCH resource lists).

In some cases, the UE may multiplex HARQ ACK feedback for SPS group-common PDSCHs with other HARQ ACK feedback for other types of downlink transmissions (e.g., based on a HARQ ACK codebook). For example, the HARQ ACK feedback for other types of downlink transmissions may include HARQ ACK feedback for multicast or group-common dynamic PDSCHs, for a multicast SPS PDSCH release message, for unicast SPS PDSCHs, for unicast dynamic PDSCHs, for a unicast SPS PDSCH release message, or a combination thereof. In some examples, the UE may multiplex the HARQ ACK feedback for the SPS group-common PDSCHs with the other HARQ ACK feedback by appending the HARQ ACK feedback for the SPS group-common PDSCHs after the other HARQ ACK feedback (e.g., after unicast downlink channels, after dynamic downlink channels, etc.). Additionally, the UE may determine a HARQ process identifier for the SPS group-common PDSCHs based on a group configured scheduled radio network temporary identifier (G-CS-RNTI), a periodicity, a number of HARQ processes, and a HARQ process identifier offset configured for the SPS group-common PDSCHs (e.g., corresponding to a group RNTI (G-CS-RNTI)).

Aspects of the disclosure are initially described in the context of wireless communications systems. Additionally, aspects of the disclosure are illustrated through an additional wireless communications system, multiplexing configurations, and a process flow. Aspects of the disclosure are further illustrated by and described with reference to apparatus diagrams, system diagrams, and flowcharts that relate to an acknowledgment feedback configuration for group-common downlink channels with repetitions.

FIG. 1 illustrates an example of a wireless communications system 100 that supports an acknowledgment feedback configuration for group-common downlink channels with repetitions in accordance with aspects of the present disclosure. The wireless communications system 100 may include one or more base stations 105, one or more UEs 115, and a core network 130. In some examples, the wireless communications system 100 may be a Long Term Evolution (LTE)

network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a base station 105 may communicate with multiple UEs 115 at once. For example, the base station 105 may use broadcasted transmissions or multicasted transmissions to convey a same message to the multiple UEs 115. Rather than specifically configuring the transmissions for each UE 115, the base station 105 may configure group-common transmissions for the multiple UEs 115 and may indicate these configurations to the multiple UEs 115 to enable the multiple UEs 115 to monitor for and receive these group-common transmissions. To support multicast communications and group-common transmissions, the base station 105 may use a common frequency resource. The base station 105 may use the common frequency resource for multicasting transmissions to UEs 115 in a connected state with the base station 105 (e.g., RRC-CONNECTED UEs). Additionally, the common frequency resource may be confined within a frequency resource of a dedicated unicast BWP and may use a same numerology (e.g., subcarrier spacing (SCS) and CP) as the BWP.

In some examples, the common frequency resource used for the multicast communications may include different configuration information (e.g., signaled to UEs 115 subscribed to receive the multicast communications). For example, the common frequency resource may be configured with a starting physical resource block (PRB) and a number of PRBs. Additionally, the common frequency resource may be used for a PDSCH configuration for MBS (e.g., separate from a PDSCH configuration of the dedicated unicast BWP), a PDCCH configuration for MBS (e.g., separate from the PDCCH-Config of the dedicated unicast BWP), one or more SPS configurations for MBS (e.g., separate from the SPS configurations of the dedicated unicast BWP), or a combination thereof.

As part of the one or more SPS configurations for MBS, the base station 105 may transmit SPS group-common PDSCHs via the multicast communications. For connected state UEs 115 (e.g., RRC_CONNECTED UEs), more than one SPS group-common PDSCH configuration for MBS may be configured per UE 115 subject to UE capability. In some examples, a total number of SPS configurations supported by a UE 115 for unicast may not be increased due to additionally supporting MBS. Additionally, the connected state UEs 115 may support HARQ acknowledgment feedback for SPS group-common PDSCHs for MBS. For activation or deactivation of SPS group-common PDSCH for MBS in the connected state (e.g., RRC_CONNECTED state), the connected state UEs 115 may at least support group-common PDCCHs. However, determining a HARQ-ACK feedback codebook for MBS SPS group-common PDSCHs and a HARQ process identifier (ID) for MBS SPS group-common PDSCHs have yet to be defined.

Wireless communications system 100 may support a UE 115 receiving an acknowledgment feedback configuration from a base station 105 for providing feedback for SPS downlink shared channels (e.g., SPS group-common PDSCHs, SPS unicast PDSCHs, etc.). For example, the acknowledgment feedback configuration may include separate resources for transmitting acknowledgment feedback for unicast downlink shared channels and for transmitting acknowledgment feedback for group-common downlink shared channels or may include common resources for transmitting acknowledgment feedback for both unicast downlink shared channels and group-common downlink shared channels. In some examples, the UE 115 may multiplex acknowledgment feedback for a set of group-common downlink shared channels with additional acknowledgment feedback for other downlink channels.

Figure 2:
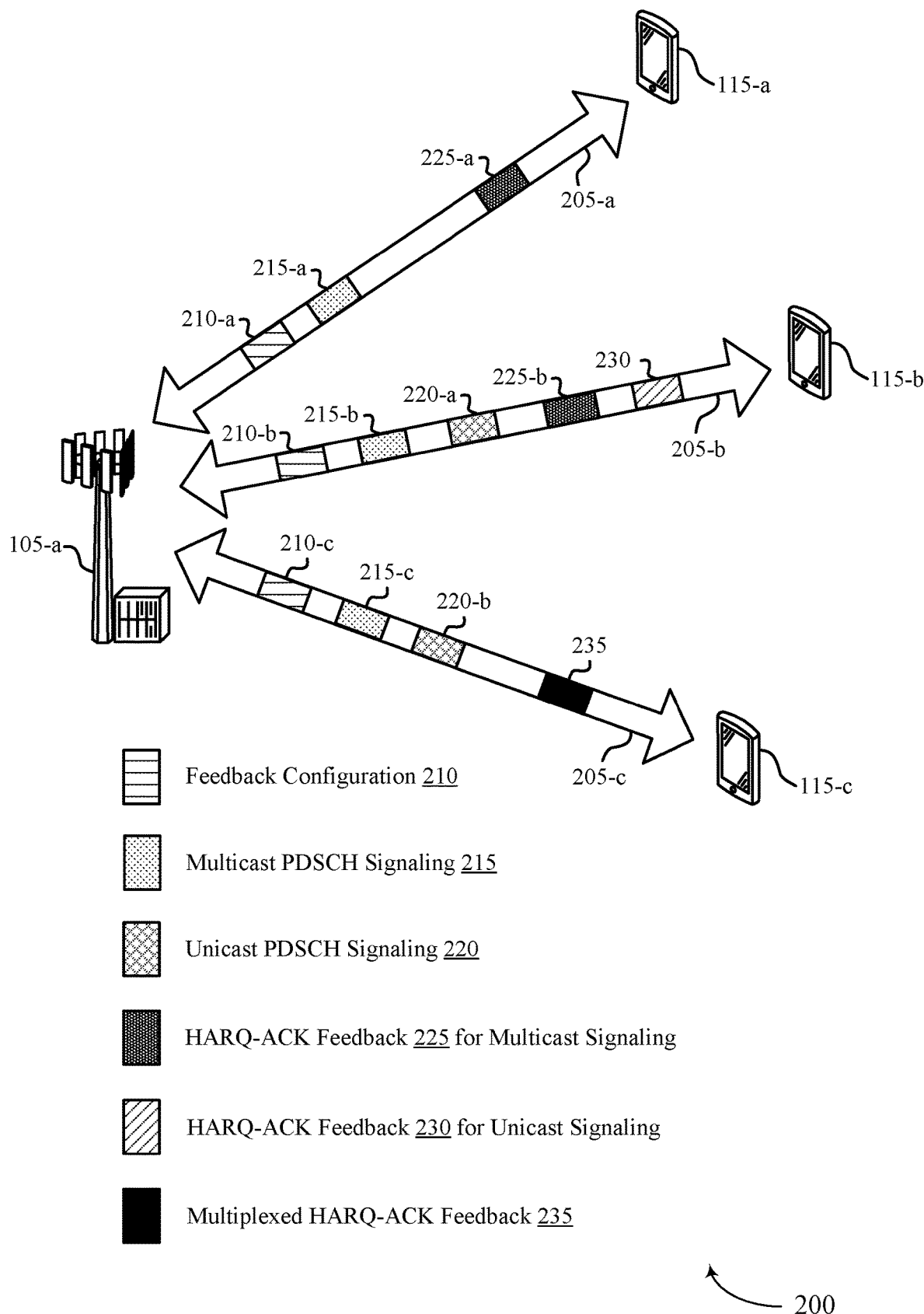
FIG. 2 illustrates an example of a wireless communications system that supports an acknowledgment feedback configuration for group-common downlink channels with repetitions in accordance with aspects of the present disclosure.

FIG. 2 illustrates an example of a wireless communications system 200 that supports an acknowledgment feedback configuration for group-common downlink channels with repetitions in accordance with aspects of the present disclosure. In some examples, wireless communications system 200 may implement aspects of or may be implemented by aspects of wireless communications system 100. For example, wireless communications system 200 may include a base station 105-a, a UE 115-a, a UE 115-b, and a UE 115-c, which may be examples of base stations 105 and UEs 115, respectively, as described with reference to FIG. 1.

Additionally, the UEs 115 may be subscribed to an MBS group to receive multicast or broadcast communications from base station 105-a. In some cases, base station 105-a may communicate control signaling, data, or both with a UE 115 via a communication link 205 (e.g., for the multicast communications), and each UE 115 may communicate control signaling, data, or both with base station 105-a via the corresponding communication link 205. For example, UE 115-a may communicate with base station 105-a via a communication link 205-a, UE 115-b may communicate with base station 105-a via a communication link 205-b, and UE 115-c may communicate with base station 105-a via a communication link 205-c. Base station 105-a may communicate with each UE 115 via broadcast services (e.g., a single message broadcasted out such that any UE 115 subscribed to the MBS group can receive it) or via multicast services (e.g., respective messages transmitted to each UE 115 subscribed to the MBS group).

As described herein, base station 105-a may transmit respective feedback configurations 210 to each UE 115 to indicate how each UE 115 is to provide feedback for SPS downlink shared channels (e.g., SPS group-common PDSCHs, SPS unicast PDSCHs, etc.). For example, base station 105-a may transmit a feedback configuration 210-a to UE 115-a (e.g., via communication link 205-a), a feedback configuration 210-b to UE 115-b (e.g., via communication link 205-b), and a feedback configuration 210-c to UE 115-c (e.g., via communication link 205-c). Accordingly, each UE 115-a may use their respective indicated feedback configurations 210 to determine PUCCH resources for transmitting acknowledgment feedback for corresponding SPS downlink shared channels, to determine how to transmit the acknowledgment feedback, to determine how to multiplex the acknowledgment feedback, or a combination thereof.

In some examples, base station 105-a may support one or multiple active unicast SPS PDSCH configurations per BWP for the UEs 115. Additionally, the UEs 115 may support one or multiple active SPS group-common PDSCH configurations that can be activated per common frequency resource. In some examples, the UEs 115 may support a maximum number of active SPS group-common PDSCH configurations based on a respective UE capability. Additionally, the UEs 115 may support different maximum total numbers of active SPS group-common PDSCH configurations and active SPS PDSCHs based on a different UE capability.

In some examples, the UEs 115 may support separate or joint activation/release of a SPS group-common PDSCH configuration for a given common frequency resource by using a group-common PDCCH or by using a UE-specific PDCCH. For separate activation/release, base station 105-a may use a HARQ process number bit (HPN) field in an activation or release downlink control information (DCI) to indicate which SPS index for a group-common PDSCH is activated. Additionally or alternatively, for joint activation/release, base station 105-a may use the HPN field to indicate one of a SPS configuration index list for activation/release of a corresponding SPS group-common PDSCH.

Additionally, base station 105-a may configure the UEs 115 to indicate how the UEs 115 are to deal with the PUCCH resources for HARQ acknowledgment (HARQ-ACK) feedback of different SPS occasions of unicast and multicast that overlap in a (sub)slot. For example, the UEs 115 may not expect to be indicated to transmit HARQ-ACK for unicast SPS PDSCHs and multicast SPS group-common PDSCHs in a same PUCCH (e.g., base station 105-a schedules the different PUCCHs to avoid overlapping). Additionally or alternatively, base station 105-a may configure the UEs 115 to drop the HARQ-ACK for unicast SPS PDSCH or that of multicast SPS group-common PDSCH if the HARQ-ACK overlaps in a same (sub)slot. For example, base station 105-a may configure this dropping rule based on a priority of HARQ-ACK configured for multicast and unicast PDSCHs. The priority may be explicitly configured by RRC or activation DCI. Additionally or alternatively, the priority may be implicitly configured based on the SPS configuration indices (e.g., lower SPS configuration index with higher priority). Additionally or alternatively, base station 105-a may configure the UEs 115 to multiplex HARQ-ACK for unicast SPS PDSCH and multicast SPS GC-PDSCH in a same PUCCH. Whether to multiplex the HARQ-ACK feedback may be dependent on the feedback mode configured for multicast SPS group-common PDSCH. If base station 105-a configures the UEs 115 to perform negative acknowledgment (NACK)-only feedback (e.g., transmit a NACK if a downlink channel is unsuccessfully received and refrain from transmitting a positive acknowledgment (ACK) if the downlink channel is successfully received) for multicast SPS group-common PDSCHs, the UEs 115 may be unable to multiplex NACK-only feedback with ACK/NACK for unicast SPS PDSCHs.

For unicast PDSCHs, base station 105-a may configure multiple PUCCH resources in an SPS PUCCH ACK/NACK list (e.g., SPS-PUCCH-AN-List) that are common for all SPS PDSCH configurations per HARQ-ACK codebook. The UEs 115 may then determine an actual PUCCH resource for the ACK/NACK feedback (e.g., ACK/NACK resource ID) to be used from the configured multiple PUCCH resources based on a HARQ-ACK payload size.

Table 1 below shows an example of which PUCCH resources can be used for transmitting ACK/NACK feedback based on a payload size of the HARQ-ACK feedback.

TABLE 1

PUCCH Resources for Different HARQ-ACK Payload Sizes

| Index | PUCCH ACK/NACK Resource ID | HARQ-ACK Payload Size | |
|---|---|---|---|
| 1st Entry | 0 | $O_{UCI} \leq 2$ | |
| 2nd Entry | 1 | $2 < O_{UCI} \leq N_{1,\,SPS}$ | $N_{1,\,SPS}$ = min{maxPayloadSize in $2^{nd}$ entry, 1706} |
| 3rd Entry | 2 | $N_{1,\,SPS} < O_{UCI} \leq N_{2,\,SPS}$ | $N_{2,\,SPS}$ = min{maxPayloadSize in $3^{rd}$ entry, 1706} |
| 4th Entry | 3 | $N_{2,\,SPS} < O_{UCI} \leq N_{3,\,SPS}$ | $N_{3,\,SPS}$ = min{maxPayloadSize in $4^{th}$ entry, 1706} |

For MBS SPS group-common PDSCHs, the UEs 115 may determine PUCCH resources for HARQ-ACK feedback based on a separate SPS PUCCH ACK/NACK list for MBS (e.g., SPS-PUCCH-AN-List for MBS) that is configured common for all SPS group-common PDSCH configurations per codebook, where the separate SPS PUCCH ACK/NACK list is different than a unicast SPS PUCCH ACK/NACK list. For cases where a UE 115 has HARQ-ACK ACK/NACK feedback for MBS SPS group-common PDSCHs alone that shall be reported (e.g., no dynamic unicast PDSCH HARQ-ACK feedback, no dynamic group-common PDSCH HARQ-ACK feedback) in a PUCCH resource, the UE 115 may support more than one bit of HARQ-ACK feedback for SPS group-common PDSCHs in a PUCCH resource. For example, as shown in the example of FIG. 2, UE 115-a may receive multicast PDSCH signaling 215-a (e.g., MBS SPS group-common PDSCHs) alone and, as such, may transmit HARQ-ACK feedback 225-a for the multicast PDSCH signaling 215-a (e.g., using more than one bit).

Additionally or alternatively, with the separate SPS PUCCH ACK/NACK lists, a UE 115 may transmit separate ACK/NACK feedback for SPS group-common PDSCHs and for SPS unicast PDSCHs based on the respective SPS PUCCH ACK/NACK lists. In some examples, each ACK/NACK feedback may include a single bit for the respective SPS group-common PDSCHs and for SPS unicast PDSCHs or may include multiple bits for each. For example, as shown in the example of FIG. 2, UE 115-b may receive both multicast PDSCH signaling 215-b and unicast PDSCH signaling 220-a. Accordingly, UE 115-b may then transmit HARQ-ACK feedback 225-b for the multicast PDSCH signaling 215-b and HARQ-ACK feedback 230 for the unicast PDSCH signaling 220-a.

Rather than configuring separate SPS PUCCH ACK/NACK lists, base station 105-a may configure a common SPS PUCCH ACK/NACK list (e.g., common SPS-PUCCH-AN-List) that is common for all SPS PDSCH (e.g., SPS unicast PDSCHs) in a dedicated BWP and SPS group-common PDSCH configurations in a common frequency resource confined within the dedicated BWP per codebook. In some examples, for cases where HARQ-ACK ACK/NACK feedback for unicast SPS PDSCH and/or MBS SPS group-common PDSCHs shall be reported (e.g., no dynamic PDSCH or group-common PDSCH HARQ-ACK) in a PUCCH resource, the UEs 115 may support more than one bit of HARQ-ACK feedback for unicast SPS PDSCH and/or MBS SPS group-common PDSCHs in a PUCCH resource. A size of the common SPS PUCCH ACK/NACK list for multicast and unicast may be larger than four (4), where four (4) is a maximum number of PUCCH resources for unicast SPS PDSCH. In some examples, the common SPS PUCCH ACK/NACK list may be used as a default option if base station 105-a does not configure the separate SPS PUCCH ACK/NACK lists for SPS unicast PDSCH and SPS group-common PDSCH.

In some examples, base station 105-a may configure the UEs 115 to multiplex HARQ-ACK feedback for different downlink channels, including SPS unicast PDSCHs and SPS group-common PDSCHs. For example, as shown in the example of FIG. 2, UE 115-c may receive both multicast PDSCH signaling 215-c and unicast PDSCH signaling 220-b and, as such, may then transmit multiplexed HARQ-ACK feedback 235 that includes HARQ-ACK feedback for both the multicast PDSCH signaling 215-c and for the unicast PDSCH signaling 220-b. In some examples, for HARQ-ACK of MBS SPS group-common PDSCHs, (e.g., in configured resources without a corresponding group-common PDCCH or unicast PDCCH), the UEs 115 may determine HARQ-ACK bit orders in codebook construction in an ascending order of downlink slot per SPS group-common PDSCH configuration index and then in ascending order of SPS group-common PDSCH configuration index in a same serving cell, then in ascending order of serving cell index.

For multiplexing HARQ-ACK of MBS SPS group-common PDSCH and HARQ-ACK of MBS dynamic group-common PDSCH or SPS group-common PDSCH release in the same serving cell, the UEs 115 may append the HARQ-ACK of MBS SPS group-common PDSCH after the HARQ-ACK of MBS dynamic group-common PDSCH or SPS group-common PDSCH release. In some examples, for multiplexing the HARQ-ACK of MBS SPS group-common PDSCH and HARQ-ACK of unicast SPS PDSCH without a corresponding PDCCH in the same serving cell, the UEs 115 may append the HARQ-ACK of MBS SPS group-common PDSCH after the HARQ-ACK of unicast SPS PDSCH. Additionally or alternatively, the UEs 115 may jointly transmit the HARQ-ACK of unicast SPS PDSCH with the HARQ-ACK of MBS SPS group-common PDSCH. For example, the UEs 115 may transmit the HARQ-ACK of unicast SPS PDSCH with the HARQ-ACK of MBS SPS group-common PDSCH based on an ascending order of SPS configuration index allocated for MBS SPS GC-PDSCH and unicast SPS PDSCH. In some examples, for multiplexing HARQ-ACK of MBS SPS group-common PDSCH and HARQ-ACK of unicast dynamic PDSCH or SPS PDSCH release in the same serving cell, the UEs 115 may append the HARQ-ACK of MBS SPS group-common PDSCH after the HARQ-ACK of unicast dynamic PDSCH or SPS PDSCH release.

For multiplexing of HARQ-ACK of MBS SPS group-common PDSCH, HARQ-ACK of MBS dynamic group-common PDSCH or SPS group-common PDSCH release, HARQ-ACK of unicast SPS PDSCH, and HARQ-ACK of unicast dynamic PDSCH or SPS PDSCH release in the same serving cell, the UEs 115 may append HARQ-ACK for any MBS transmissions after HARQ-ACK for unicast transmissions. For example, the UEs 115 may multiplex the HARQ-ACK based on an order of the HARQ-ACK of unicast dynamic PDSCH or SPS PDSCH release first, the HARQ-ACK of unicast SPS PDSCH second, the HARQ-ACK of MBS dynamic group-common PDSCH or SPS group-common PDSCH release third, and the HARQ-ACK of MBS SPS group-common PDSCH last. Additionally or alternatively, the UEs 115 may append HARQ-ACK for SPS PDSCHs after HARQ-ACK for dynamic PDSCHs. For example, the UEs 115 may multiplex the HARQ-ACK based on an order of the HARQ-ACK of unicast dynamic PDSCH or SPS PDSCH release first, the HARQ-ACK of MBS dynamic group-common PDSCH or SPS group-common PDSCH release second, the HARQ-ACK of unicast SPS PDSCH third, and the HARQ-ACK of MBS SPS group-common PDSCH last (e.g., or with the HARQ-ACK of unicast SPS PDSCH and the HARQ-ACK of MBS SPS group-common PDSCH being jointly appended last).

For collision handling, if more than one SPS group-common PDSCH on a serving cell each without a corresponding PDCCH transmission are partially or fully overlapping in time, a UE 115 may not receive a group-common PDSCH among these group-common PDSCHs other than one with a lowest configured sps-ConfigIndex for MBS. If a UE 115 does not indicate a capability to receive more than one group-common PDSCH per slot and if there is more than one SPS group-common PDSCH on a serving cell each without a corresponding PDCCH transmission in a slot, the UE 115 may not receive a group-common PDSCH among these group-common PDSCHs other than one with a lowest configured sps-ConfigIndex for MBS on the serving cell. In a slot with more one or more SPS group-common PDSCHs each without a corresponding PDCCH, HARQ-ACK feedback for a SPS group-common PDSCH may not be included in the HARQ-ACK codebook if the SPS group-common PDSCH is not received due to overlapping SPS PDSCHs without associated PDCCH or based on a UE capability for the number of PDSCH receptions in a slot. The UE capability of receiving more than one SPS group-common PDSCH without associated PDCCH may be separate from that of receiving more than one SPS unicast PDSCH without associated PDCCH.

Additionally or alternatively, there may be a UE capability of receiving more than one SPS group-common and/or unicast PDSCH without associated PDCCH. In this case, if more than one SPS group-common and/or unicast PDSCH on a serving cell each without a corresponding PDCCH transmission are partially or fully overlapping in time, a UE 115 may not receive a PDSCH among these PDSCHs other than one with a lowest configured sps-ConfigIndex of MBS and unicast, where the order of sps-ConfigIndex for MBS may be configured higher or lower than that of unicast. If a UE 115 does not indicate a capability to receive more than one group-common and/or unicast PDSCH per slot and if there is more than one SPS group-common and/or unicast PDSCH on a serving cell each without a corresponding PDCCH transmission in a slot, the UE 115 may not receive a PDSCH among these PDSCHs other than one with the lowest configured sps-ConfigIndex of MBS and unicast on the serving cell.

In some examples, HARQ process IDs for unicast SPS PDSCH may be determined based on different parameters. For configured downlink assignments without an offset (e.g., harq-ProcID-Offset), the HARQ Process ID associated with the slot where the DL transmission starts may be derived from Equation (1) given below.

$$\text{HARQ Process ID}=[\text{floor}(\text{CURRENT\_slot}\times 10/(\text{numberOfSlotsPerFrame}\times\text{periodicity}))]\text{modulo}(\text{nrofHARQ Processes}) \quad (1)$$

where CURRENT_slot=[(SFN×numberOfSlotsPerFrame)+ slot number in the frame] and numberOfSlotsPerFrame refers to a number of consecutive slots per frame.

Additionally or alternatively, for configured downlink assignments with an offset (e.g., harq-ProcID-Offset) configured, the HARQ Process ID associated with the slot where the downlink transmission starts may be derived from Equation (2) given below.

$$\text{HARQ Process ID}=[\text{floor}(\text{CURRENT\_slot}\times 10/(\text{numberOfSlotsPerFrame}\times\text{periodicity}))]\text{modulo}(\text{nrofHARQ Processes})+(\text{harq ProcID Offset}) \quad (2)$$

where CURRENT_slot=[(SFN×numberOfSlotsPerFrame)+ slot number in the frame] and numberOfSlotsPerFrame refers to a number of consecutive slots per frame.

For downlink SPS, a downlink assignment may be provided by PDCCH, and stored or cleared based on Layer 1 (L1) signalling indicating SPS activation or deactivation. Additionally, base station 105-a may configure multiple parameters via RRC signalling when the SPS is configured. For example, base station 105-a may configure a configured scheduling (CS) radio network temporary identifier (CS-RNTI) (e.g., for activation, deactivation, and retransmission), a number of HARQ processes (nrofHARQ-Processes) (e.g., a number of configured HARQ processes for SPS), an offset value (harq-ProcID-Offset) (e.g., an offset of HARQ process for SPS), and a periodicity (e.g., periodicity of configured downlink assignment for SPS).

For multicast SPS group-common PDSCHs, the UEs 115 may determine HARQ process IDs for multicast SPS group-common PDSCHs in a similar way as unicast SPS PDSCH. For example, the UEs 115 may determine the HARQ process IDs based on a group CS-RNTI, a periodicity, a number of HARQ processes, a HARQ process ID offset configured per SPS-config for MBS, or a combination thereof. Base station 105-a may configure these parameters (e.g., CS-RNTI, nrofHARQ-Processes, harq-ProcID-Offset, etc.) separately for cell RNTIs (C-RNTIs) and group RNTIs (G-RNTIs) and may configure potentially different values for different G-RNTIs (e.g., corresponding to different MBS services).

Figure 3A:
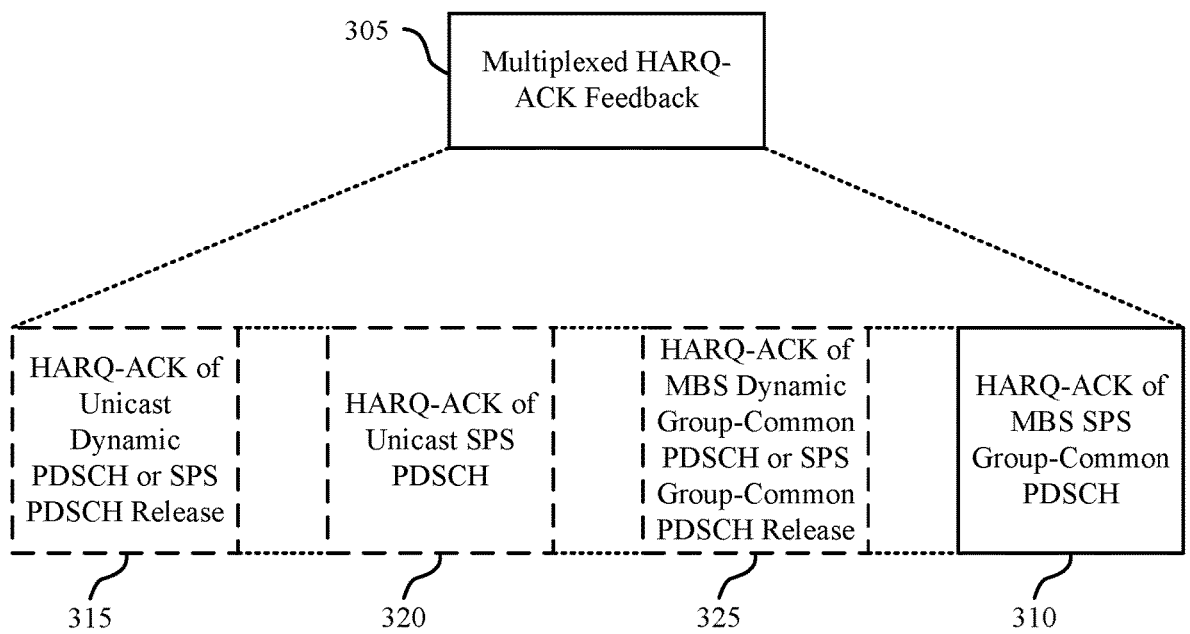
FIGS. 3A and 3B illustrate examples of multiplexing configurations that support an acknowledgment feedback configuration for group-common downlink channels with repetitions in accordance with aspects of the present disclosure.
Figure 3B:
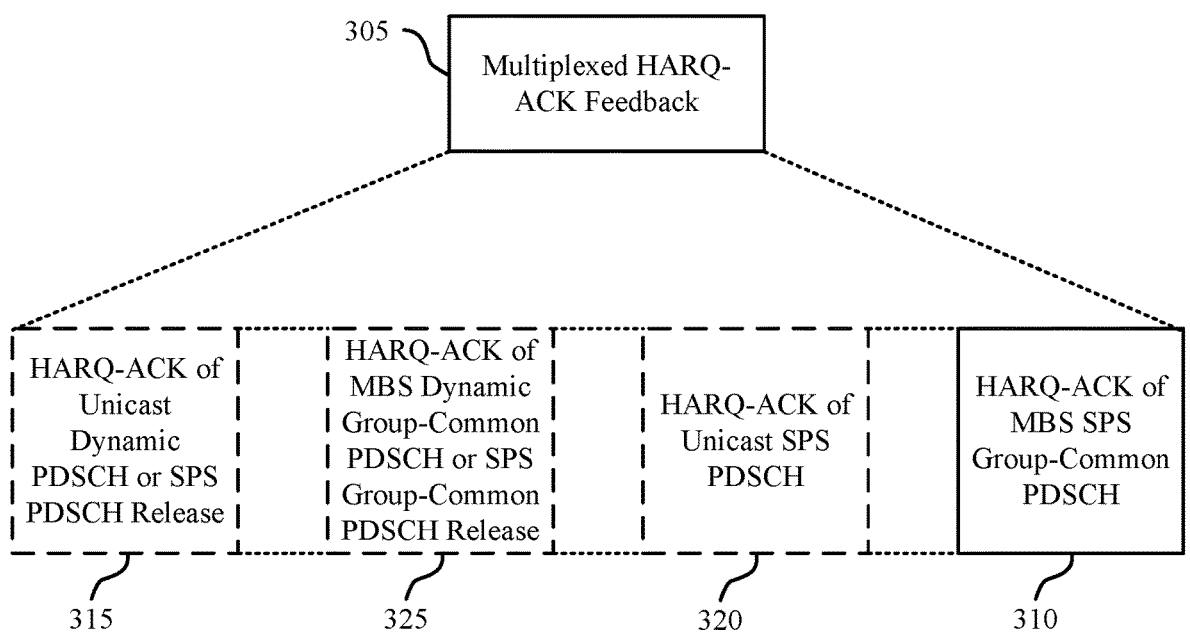

FIGS. 3A and 3B illustrate examples of multiplexing configurations 300 and 301, respectively, that support an acknowledgment feedback configuration for group-common downlink channels with repetitions in accordance with aspects of the present disclosure. Multiplexing configurations 300 and 301 may implement aspects of or may be implemented by aspects of wireless communications system 100, wireless communications system 200, or both. For example, a UE 115 may use multiplexing configurations 300 and 301 when transmitting multiplexed HARQ-ACK feedback 305 for different kinds of downlink channels to a base station 105.

For example, as shown in the example of FIG. 3A, if configured to multiplex HARQ-ACK feedback for different downlink channels, the UE 115 may transmit the multiplexed HARQ-ACK feedback 305 based on an order of appending HARQ-ACK for any MBS transmissions after HARQ-ACK for unicast transmissions. For example, the UE 115 may multiplex the HARQ-ACK based on an order of HARQ-ACK 315 of unicast dynamic PDSCH or SPS PDSCH release first, HARQ-ACK 320 of unicast SPS PDSCH second, HARQ-ACK 325 of MBS dynamic group-common PDSCH or SPS group-common PDSCH release third, and HARQ-ACK 310 of MBS SPS group-common PDSCH last.

Additionally or alternatively, as shown in the example of FIG. 3B, the UE 115 may append HARQ-ACK for SPS PDSCHs after HARQ-ACK for dynamic PDSCHs. For example, the UE 115 may multiplex the HARQ-ACK based on an order of the HARQ-ACK 315 of unicast dynamic PDSCH or SPS PDSCH release first, the HARQ-ACK 325 of MBS dynamic group-common PDSCH or SPS group-common PDSCH release second, the HARQ-ACK 320 of unicast SPS PDSCH third, and the HARQ-ACK 310 of MBS SPS group-common PDSCH last (e.g., or with the HARQ-ACK 320 of unicast SPS PDSCH and the HARQ-ACK 310 of MBS SPS group-common PDSCH being jointly appended last).

Figure 4:
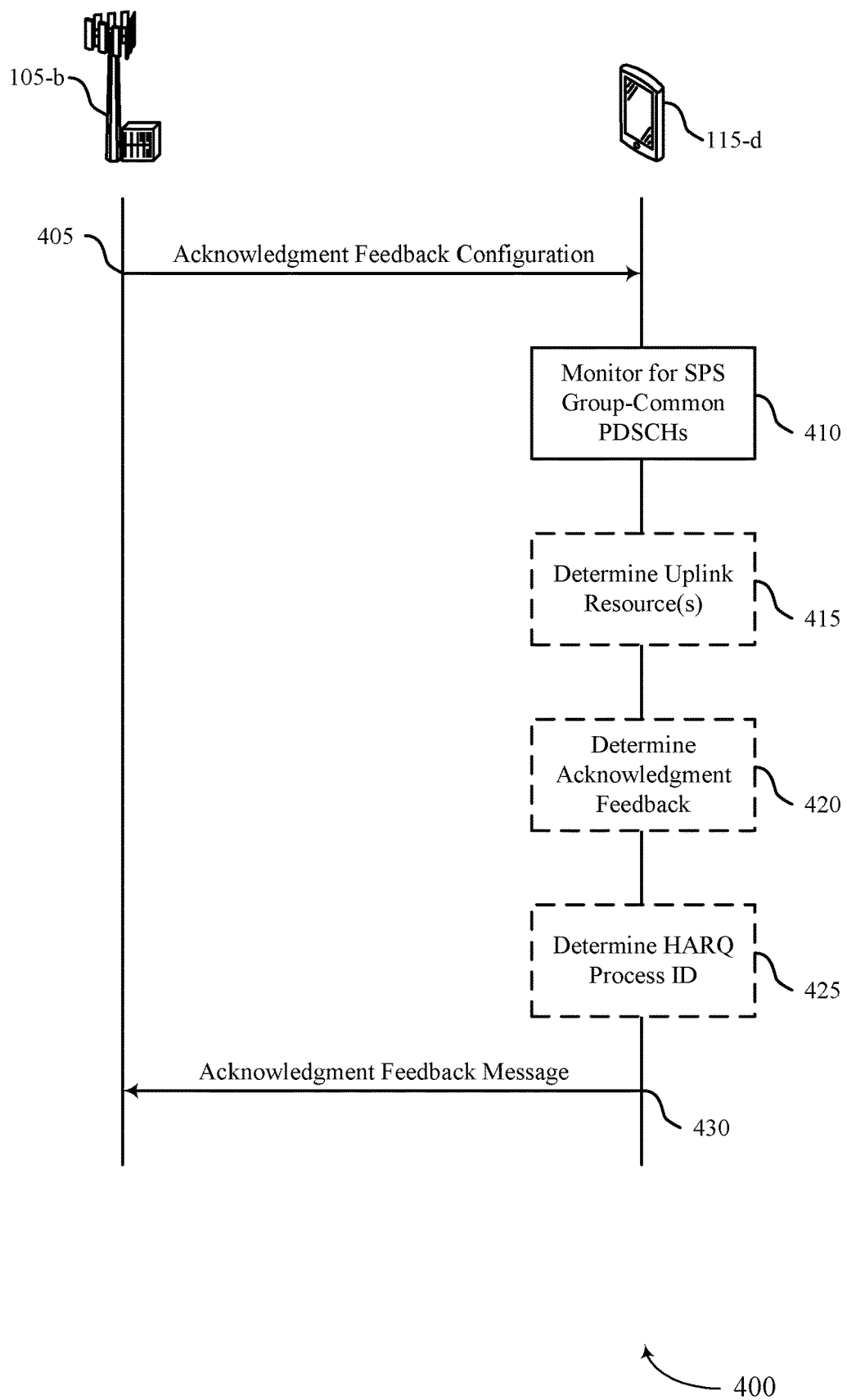
FIG. 4 illustrates an example of a process flow that supports an acknowledgment feedback configuration for group-common downlink channels with repetitions in accordance with aspects of the present disclosure.

FIG. 4 illustrates an example of a process flow 400 that supports an acknowledgment feedback configuration for group-common downlink channels with repetitions in accordance with aspects of the present disclosure. In some examples, process flow 400 may implement aspects of or may be implemented by aspects of wireless communications system 100, wireless communications system 200, or both. For example, process flow 400 may include a base station 105-*b* and a UE 115-*d*, which may represent examples of corresponding base stations 105 and UEs 115, respectively, as described with reference to FIGS. 1-3.

In the following description of process flow 400, the operations between UE 115-*d* and base station 105-*b* may be performed in different orders or at different times. Certain operations may also be left out of process flow 400, or other operations may be added to process flow 400. It is to be understood that while UE 115-*d* and base station 105-*b* are shown performing a number of the operations of process flow 400, any wireless device may perform the operations shown.

At 405, UE 115-*d* may receive, from base station 105-*b*, an acknowledgment feedback configuration for providing feedback for a set of downlink shared channels configured for SPS, the set of downlink shared channels configured for SPS including one or more sets of unicast semi-persistent downlink shared channels (e.g., unicast SPS PDSCHs) and one or more sets of group-common semi-persistent downlink shared channels (e.g., group-common SPS PDSCHs). Additionally, the acknowledgment feedback configuration may include either separate resources for providing feedback for unicast semi-persistent downlink shared channels and group-common semi-persistent downlink shared channels or may include common resources for providing feedback for both unicast semi-persistent downlink shared channels and group-common semi-persistent downlink shared channels.

For example, UE 115-*d* may receive a first list of uplink control channel resources for transmitting acknowledgment feedback for the one or more sets of unicast semi-persistent downlink shared channels (e.g., first SPS-PUCCH-AN-List for unicast) and may receive a second list of uplink control channel resources for transmitting acknowledgment feedback for the one or more sets of group-common semi-persistent downlink shared channels (e.g., second SPS-PUCCH-AN-List for MBS), the second list being different than the first list. Additionally or alternatively, UE 115-*d* may receive a common list of uplink control channel resources for transmitting acknowledgment feedback for the one or more sets of unicast semi-persistent downlink shared channels and for the one or more sets of group-common semi-persistent downlink shared channels (e.g., common SPS-PUCCH-AN-List for unicast and MBS). In some examples, a size of the common list may be different than a size of a list of uplink control channel resources configured for transmitting acknowledgment feedback for the one or more sets of unicast semi-persistent downlink shared channels.

In some examples, UE 115-*d* may receive a configuration for transmitting either acknowledgment feedback for a set of unicast semi-persistent downlink shared channels or acknowledgment feedback for a set of group-common semi-persistent downlink shared channels in a same uplink control channel. Additionally or alternatively, UE 115-*d* may receive a dropping configuration for dropping a first acknowledgment feedback message for a set of unicast semi-persistent downlink shared channels or a second acknowledgment feedback message for a set of group-common semi-persistent downlink shared channels based on the first acknowledgment feedback message and the second acknowledgment feedback message overlapping in a same transmission time interval. Additionally or alternatively, UE 115-*d* may receive a multiplexing configuration for multiplexing acknowledgment feedback for the one or more sets of unicast semi-persistent downlink shared channels and for the one or more sets of group-common semi-persistent downlink shared channels in a same uplink control channel.

At 410, UE 115-*d* may monitor for at least a first set of group-common semi-persistent downlink shared channels of the set of downlink shared channels configured for SPS.

At 415, UE 115-*d* may determine uplink resources for transmitting an acknowledgment feedback message for at least the first set of group-common semi-persistent downlink shared channels. For example, UE 115-*d* may determine a first uplink control channel resource from the second list to transmit the acknowledgment feedback message based on a payload size of the acknowledgment feedback message. Additionally or alternatively, UE 115-*d* may determine a first uplink control channel resource from the common list to transmit the acknowledgment feedback message based on a payload size of the acknowledgment feedback message.

At 420, UE 115-*d* may determine different parameters for transmitting the acknowledgment feedback message for at least the first set of group-common semi-persistent downlink shared channels. For example, UE 115-*d* may determine a number of bits to transmit in the acknowledgment feedback message based on whether acknowledgment feedback for a dynamic downlink shared channel is to be transmitted at a same time as the acknowledgment feedback message for one or more semi-persistent downlink shared channels. Additionally, UE 115-*d* may determine an acknowledgment codebook for transmitting the acknowledgment feedback message based on a first order of slots per configuration index of the one or more sets of group-common semi-persistent downlink shared channels in a same serving cell, a second order of configuration indexes of the one or more sets of group-common semi-persistent downlink shared channels in a same serving cell, a third order of serving cell indexes, or a combination thereof.

At 425, UE 115-*d* may determine a HARQ process ID for transmitting the acknowledgment feedback message for at least the first set of group-common semi-persistent downlink shared channels based on a set of parameters configured for an SPS configuration corresponding to the first set of group-common semi-persistent downlink shared channels. In some examples, the set of parameters may include a CS-RNTI, a periodicity, a number of HARQ processes, a HARQ process ID offset, or a combination thereof, configured for the SPS configuration. Additionally, the set of parameters may be determined based on a G-RNTI configured for a group of UEs that includes UE 115-*d*.

At 430, UE 115-*d* may transmit, to base station 105-*b* and in accordance with the acknowledgment feedback configuration, an acknowledgment feedback message for at least the first set of group-common semi-persistent downlink shared channels based on the monitoring. In some examples, UE 115-*d* may transmit the acknowledgment feedback message based on multiplexing acknowledgment feedback for at least the first set of group-common semi-persistent downlink shared channels with one or more acknowledgment feedback indications for respective downlink shared channels. For example, the acknowledgment feedback for at least the first set of group-common semi-persistent downlink shared channels may be appended after the one or more acknowledgment feedback indications in the acknowledgment feedback message. In some examples, the one or more acknowledgment feedback indications for respective downlink shared channels may include acknowledgment feedback for a dynamic group-common downlink shared channel, for a first release message to release a configuration for a set of semi-persistent group-common downlink shared channels, for a set of unicast downlink shared channel, for a unicast dynamic downlink shared channel, for a second release message to release a set of downlink shared channels, or a combination thereof.

Figure 5:
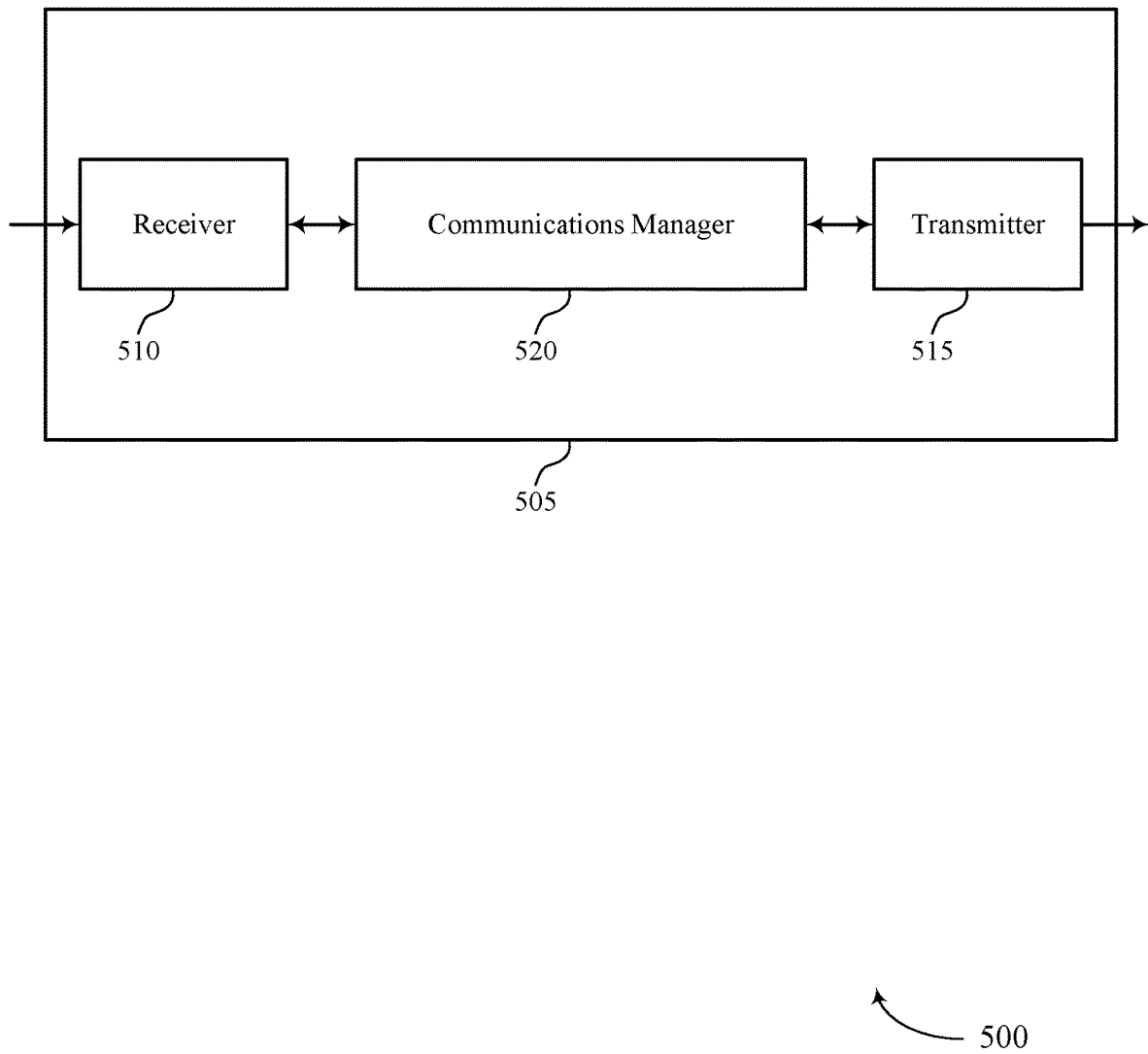
FIGS. 5 and 6 show block diagrams of devices that support an acknowledgment feedback configuration for group-common downlink channels with repetitions in accordance with aspects of the present disclosure.

FIG. 5 shows a block diagram 500 of a device 505 that supports an acknowledgment feedback configuration for group-common downlink channels with repetitions in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to an acknowledgment feedback configuration for group-common downlink channels with repetitions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to an acknowledgment feedback configuration for group-common downlink channels with repetitions). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of an acknowledgment feedback configuration for group-common downlink channels with repetitions as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a base station, an acknowledgment feedback configuration for providing feedback for a set of multiple downlink shared channels configured for semi-persistent scheduling, the set of multiple downlink shared channels configured for semi-persistent scheduling including one or more sets of unicast semi-persistent downlink shared channels and one or more sets of group-common semi-persistent downlink shared channels, the acknowledgment feedback configuration including either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels. The communications manager 520 may be configured as or otherwise support a means for monitoring for at least a first set of group-common semi-persistent downlink shared channels of the set of multiple downlink shared channels configured for semi-persistent scheduling. The communications manager 520 may be configured as or otherwise support a means for transmitting, to the base station and in accordance with the acknowledgment feedback configuration, an acknowledgment feedback message for at least the first set of group-common semi-persistent downlink shared channels based on the monitoring.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more efficient utilization of communication resources.

Figure 6:
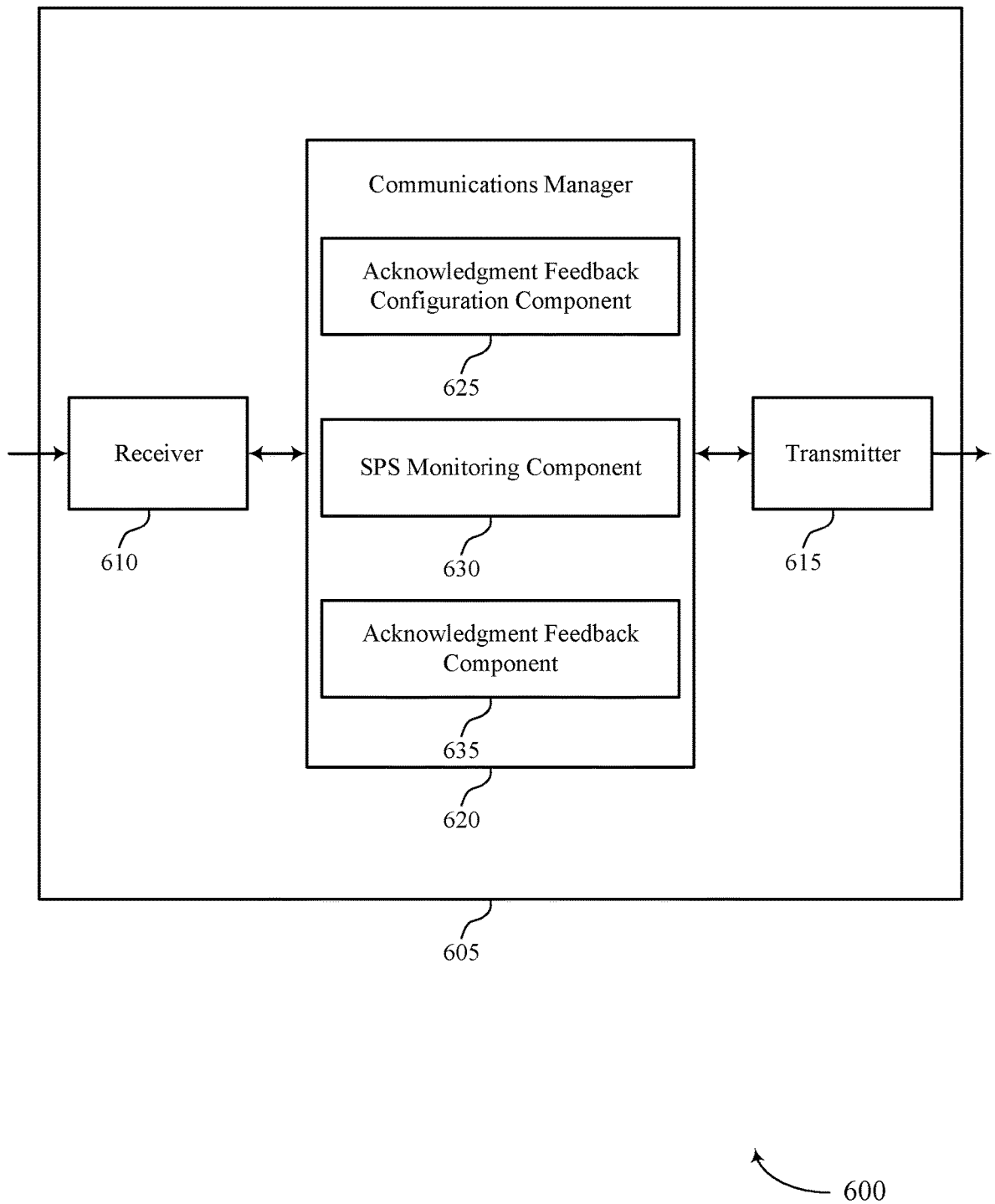

FIG. 6 shows a block diagram 600 of a device 605 that supports an acknowledgment feedback configuration for group-common downlink channels with repetitions in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to an acknowledgment feedback configuration for group-common downlink channels with repetitions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to an acknowledgment feedback configuration for group-common downlink channels with repetitions). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of an acknowledgment feedback configuration for group-common downlink channels with repetitions as described herein. For example, the communications manager 620 may include an acknowledgment feedback configuration component 625, an SPS monitoring component 630, an acknowledgment feedback component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The acknowledgment feedback configuration component 625 may be configured as or otherwise support a means for receiving, from a base station, an acknowledgment feedback configuration for providing feedback for a set of multiple downlink shared channels configured for semi-persistent scheduling, the set of multiple downlink shared channels configured for semi-persistent scheduling including one or more sets of unicast semi-persistent downlink shared channels and one or more sets of group-common semi-persistent downlink shared channels, the acknowledgment feedback configuration including either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels. The SPS monitoring component 630 may be configured as or otherwise support a means for monitoring for at least a first set of group-common semi-persistent downlink shared channels of the set of multiple downlink shared channels configured for semi-persistent scheduling. The acknowledgment feedback component 635 may be configured as or otherwise support a means for transmitting, to the base station and in accordance with the acknowledgment feedback configuration, an acknowledgment feedback message for at least the first set of group-common semi-persistent downlink shared channels based on the monitoring.

Figure 7:
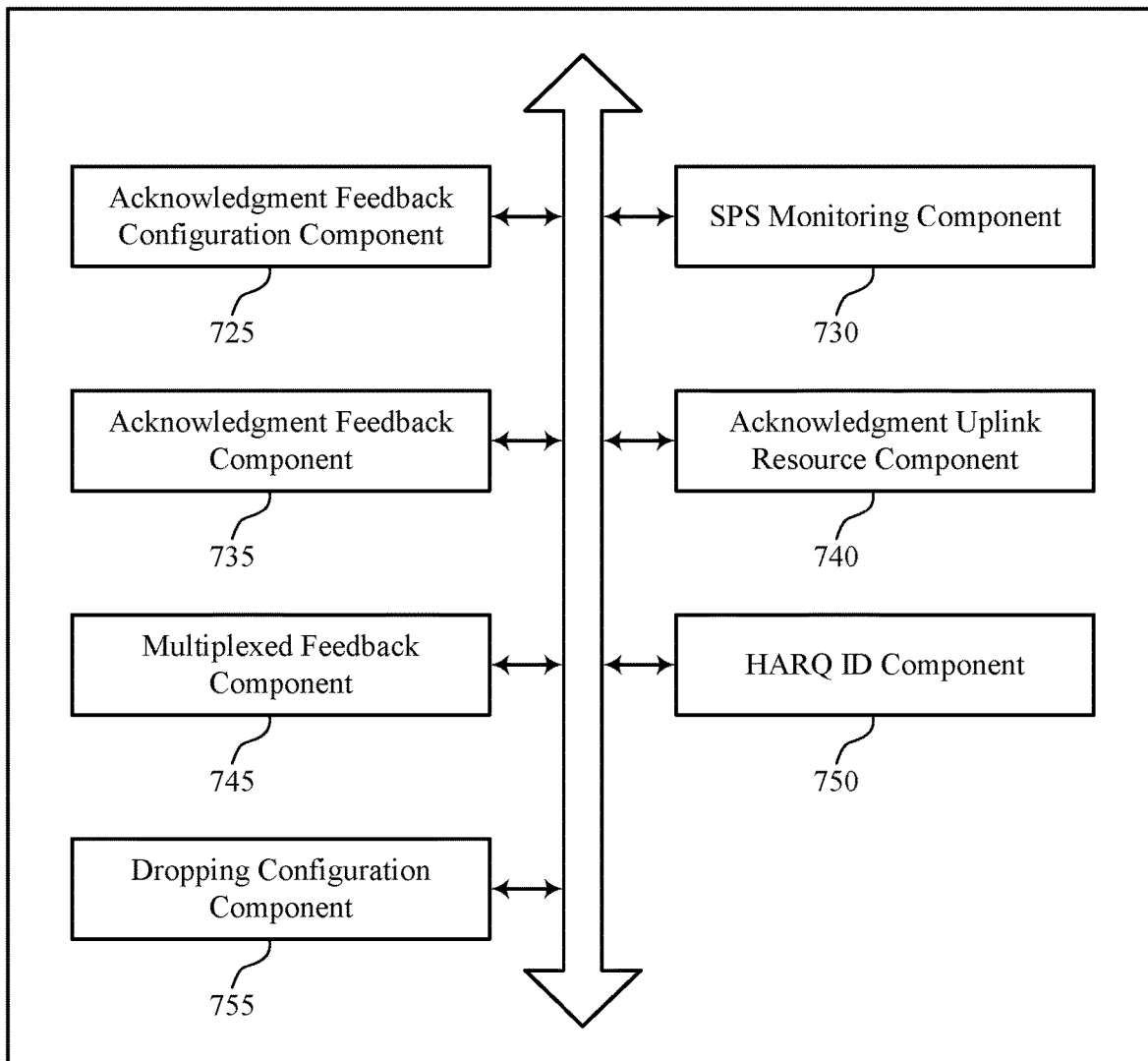
FIG. 7 shows a block diagram of a communications manager that supports an acknowledgment feedback configuration for group-common downlink channels with repetitions in accordance with aspects of the present disclosure.

FIG. 7 shows a block diagram 700 of a communications manager 720 that supports an acknowledgment feedback configuration for group-common downlink channels with repetitions in accordance with aspects of the present disclosure. The communications manager 720 may be an example of aspects of a communications manager 520, a communications manager 620, or both, as described herein. The communications manager 720, or various components thereof, may be an example of means for performing various aspects of an acknowledgment feedback configuration for group-common downlink channels with repetitions as described herein. For example, the communications manager 720 may include an acknowledgment feedback configuration component 725, an SPS monitoring component 730, an acknowledgment feedback component 735, an acknowledgment uplink resource component 740, a multiplexed feedback component 745, an HARQ ID component 750, a dropping configuration component 755, or any combination thereof. Each of these components may communicate, directly or indirectly, with one another (e.g., via one or more buses).

The communications manager 720 may support wireless communications at a UE in accordance with examples as disclosed herein. The acknowledgment feedback configuration component 725 may be configured as or otherwise support a means for receiving, from a base station, an acknowledgment feedback configuration for providing feedback for a set of multiple downlink shared channels configured for semi-persistent scheduling, the set of multiple downlink shared channels configured for semi-persistent scheduling including one or more sets of unicast semi-persistent downlink shared channels and one or more sets of group-common semi-persistent downlink shared channels, the acknowledgment feedback configuration including either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels. The SPS monitoring component 730 may be configured as or otherwise support a means for monitoring for at least a first set of group-common semi-persistent downlink shared channels of the set of multiple downlink shared channels configured for semi-persistent scheduling. The acknowledgment feedback component 735 may be configured as or otherwise support a means for transmitting, to the base station and in accordance with the acknowledgment feedback configuration, an acknowledgment feedback message for at least the first set of group-common semi-persistent downlink shared channels based on the monitoring.

In some examples, to support receiving the acknowledgment feedback configuration, the acknowledgment uplink resource component 740 may be configured as or otherwise support a means for receiving a first list of uplink control channel resources for transmitting acknowledgment feedback for the one or more sets of unicast semi-persistent downlink shared channels. In some examples, to support receiving the acknowledgment feedback configuration, the acknowledgment uplink resource component 740 may be configured as or otherwise support a means for receiving a second list of uplink control channel resources for transmitting acknowledgment feedback for the one or more sets of group-common semi-persistent downlink shared channels, the second list being different than the first list.

In some examples, the acknowledgment uplink resource component 740 may be configured as or otherwise support a means for determining a first uplink control channel resource from the second list to transmit the acknowledgment feedback message based on a payload size of the acknowledgment feedback message.

In some examples, to support receiving the acknowledgment feedback configuration, the acknowledgment uplink resource component 740 may be configured as or otherwise support a means for receiving a common list of uplink control channel resources for transmitting acknowledgment feedback for the one or more sets of unicast semi-persistent downlink shared channels and for the one or more sets of group-common semi-persistent downlink shared channels.

In some examples, the acknowledgment uplink resource component 740 may be configured as or otherwise support a means for determining a first uplink control channel resource from the common list to transmit the acknowledgment feedback message based on a payload size of the acknowledgment feedback message.

In some examples, a size of the common list is different than a size of a list of uplink control channel resources configured for transmitting acknowledgment feedback for the one or more sets of unicast semi-persistent downlink shared channels.

In some examples, the acknowledgment feedback component 735 may be configured as or otherwise support a means for determining a number of bits to transmit in the acknowledgment feedback message based on whether acknowledgment feedback for a dynamic downlink shared channel is to be transmitted at a same time as the acknowledgment feedback message for one or more semi-persistent downlink shared channels.

In some examples, the acknowledgment feedback component 735 may be configured as or otherwise support a means for determining an acknowledgment codebook for transmitting the acknowledgment feedback message based on a first order of slots per configuration index of the one or more sets of group-common semi-persistent downlink shared channels in a same serving cell, a second order of configuration indexes of the one or more sets of group-common semi-persistent downlink shared channels in a same serving cell, a third order of serving cell indexes, or a combination thereof.

In some examples, to support transmitting the acknowledgment feedback message, the multiplexed feedback component 745 may be configured as or otherwise support a means for transmitting the acknowledgment feedback message based on multiplexing acknowledgment feedback for at least the first set of group-common semi-persistent downlink shared channels with one or more acknowledgment feedback indications for respective downlink shared channels.

In some examples, the acknowledgment feedback for at least the first set of group-common semi-persistent downlink shared channels is appended after the one or more acknowledgment feedback indications in the acknowledgment feedback message.

In some examples, the one or more acknowledgment feedback indications for respective downlink shared channels include acknowledgment feedback for a dynamic group-common downlink shared channel, for a first release message to release a configuration for a set of semi-persistent group-common downlink shared channels, for a set of unicast downlink shared channel, for a unicast dynamic downlink shared channel, for a second release message to release a set of downlink shared channels, or a combination thereof.

In some examples, the HARQ ID component 750 may be configured as or otherwise support a means for determining a hybrid automatic repeat request process identifier for transmitting the acknowledgment feedback message for at least the first set of group-common semi-persistent downlink shared channels based on a set of parameters configured for a semi-persistent scheduling configuration corresponding to the first set of group-common semi-persistent downlink shared channels.

In some examples, the set of parameters includes a configured scheduling radio network temporary identifier, a periodicity, a number of hybrid automatic repeat request processes, a hybrid automatic repeat request process identifier offset, or a combination thereof, configured for the semi-persistent scheduling configuration.

In some examples, the set of parameters are determined based on a group radio network temporary identifier configured for a group of UEs including the UE.

In some examples, to support receiving the acknowledgment feedback configuration, the acknowledgment feedback configuration component 725 may be configured as or otherwise support a means for receiving a configuration for transmitting either acknowledgment feedback for a set of unicast semi-persistent downlink shared channels or acknowledgment feedback for a set of group-common semi-persistent downlink shared channels in a same uplink control channel.

In some examples, to support receiving the acknowledgment feedback configuration, the dropping configuration component 755 may be configured as or otherwise support a means for receiving a dropping configuration for dropping a first acknowledgment feedback message for a set of unicast semi-persistent downlink shared channels or a second acknowledgment feedback message for a set of group-common semi-persistent downlink shared channels based on the first acknowledgment feedback message and the second acknowledgment feedback message overlapping in a same transmission time interval.

In some examples, to support receiving the acknowledgment feedback configuration, the multiplexed feedback component 745 may be configured as or otherwise support a means for receiving a multiplexing configuration for multiplexing acknowledgment feedback for the one or more sets of unicast semi-persistent downlink shared channels and for the one or more sets of group-common semi-persistent downlink shared channels in a same uplink control channel.

Figure 8:
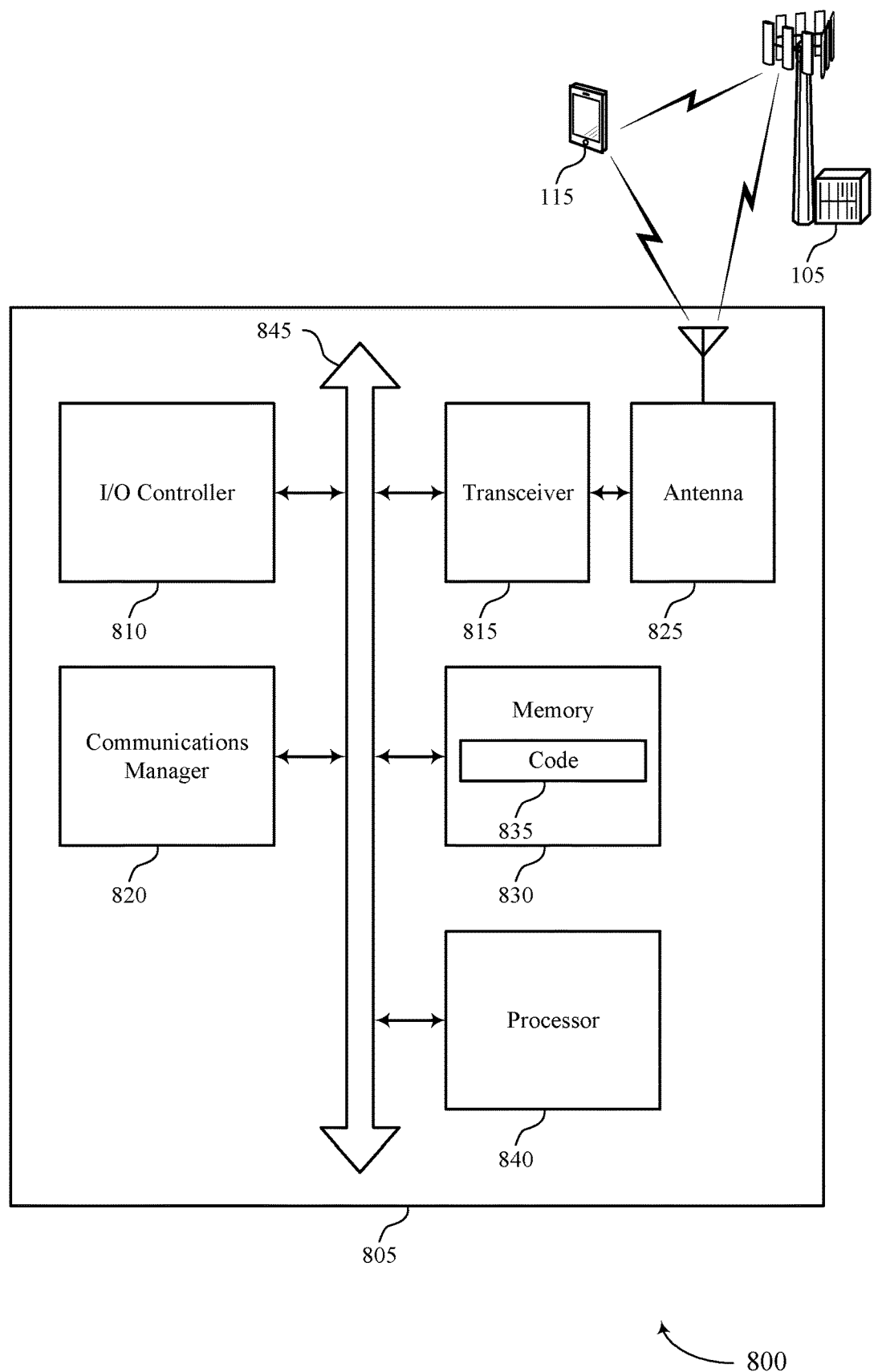
FIG. 8 shows a diagram of a system including a device that supports an acknowledgment feedback configuration for group-common downlink channels with repetitions in accordance with aspects of the present disclosure.

FIG. 8 shows a diagram of a system 800 including a device 805 that supports an acknowledgment feedback configuration for group-common downlink channels with repetitions in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting an acknowledgment feedback configuration for group-common downlink channels with repetitions). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station, an acknowledgment feedback configuration for providing feedback for a set of multiple downlink shared channels configured for semi-persistent scheduling, the set of multiple downlink shared channels configured for semi-persistent scheduling including one or more sets of unicast semi-persistent downlink shared channels and one or more sets of group-common semi-persistent downlink shared channels, the acknowledgment feedback configuration including either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels. The communications manager 820 may be configured as or otherwise support a means for monitoring for at least a first set of group-common semi-persistent downlink shared channels of the set of multiple downlink shared channels configured for semi-persistent scheduling. The communications manager 820 may be configured as or otherwise support a means for transmitting, to the base station and in accordance with the acknowledgment feedback configuration, an acknowledgment feedback message for at least the first set of group-common semi-persistent downlink shared channels based on the monitoring.

By including or configuring the communications manager 820 in accordance with examples as described herein, the device 805 may support techniques for improved communication reliability, more efficient utilization of communication resources, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of an acknowledgment feedback configuration for group-common downlink channels with repetitions as described herein, or the processor 840 and the memory 830 may be otherwise configured to perform or support such operations.

Figure 9:
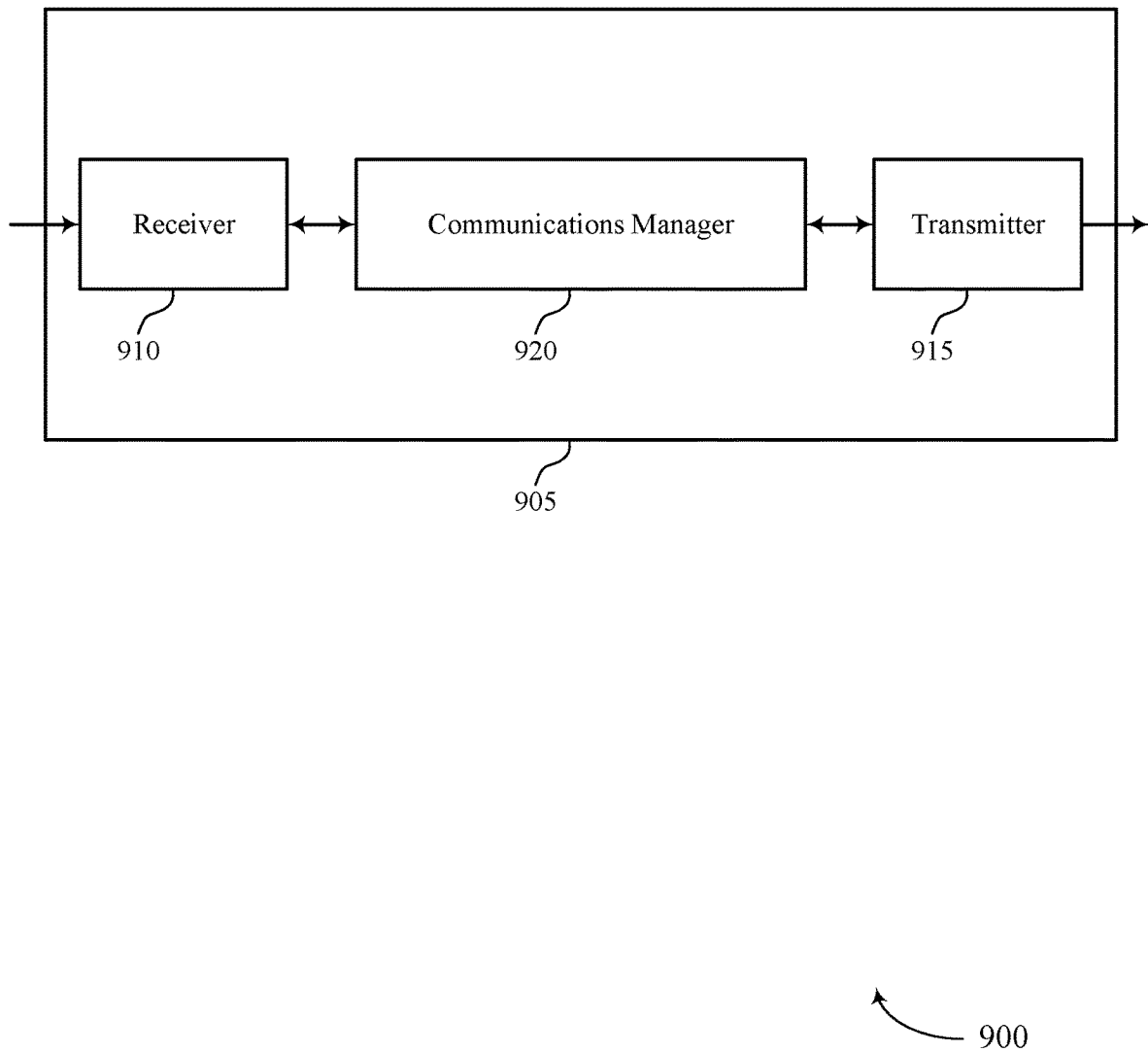
FIGS. 9 and 10 show block diagrams of devices that support an acknowledgment feedback configuration for group-common downlink channels with repetitions in accordance with aspects of the present disclosure.

FIG. 9 shows a block diagram 900 of a device 905 that supports an acknowledgment feedback configuration for group-common downlink channels with repetitions in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to an acknowledgment feedback configuration for group-common downlink channels with repetitions). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to an acknowledgment feedback configuration for group-common downlink channels with repetitions). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of an acknowledgment feedback configuration for group-common downlink channels with repetitions as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting, to one or more user equipment (UEs), an acknowledgment feedback configuration for providing feedback for a set of multiple downlink shared channels configured for semi-persistent scheduling, the set of multiple downlink shared channels configured for semi-persistent scheduling including one or more sets of unicast semi-persistent downlink shared channels and one or more sets of group-common semi-persistent downlink shared channels, the acknowledgment feedback configuration including either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels. The communications manager 920 may be configured as or otherwise support a means for transmitting, to at least a first UE of the one or more UEs, at least a first set of group-common semi-persistent downlink shared channels of the set of multiple downlink shared channels configured for semi-persistent scheduling. The communications manager 920 may be configured as or otherwise support a means for receiving, from at least the first UE according to the acknowledgment feedback configuration, an acknowledgment feedback message for at least the first set of group-common semi-persistent downlink shared channels based on the transmitting at least the first set of group-common semi-persistent downlink shared channels.

Figure 10:
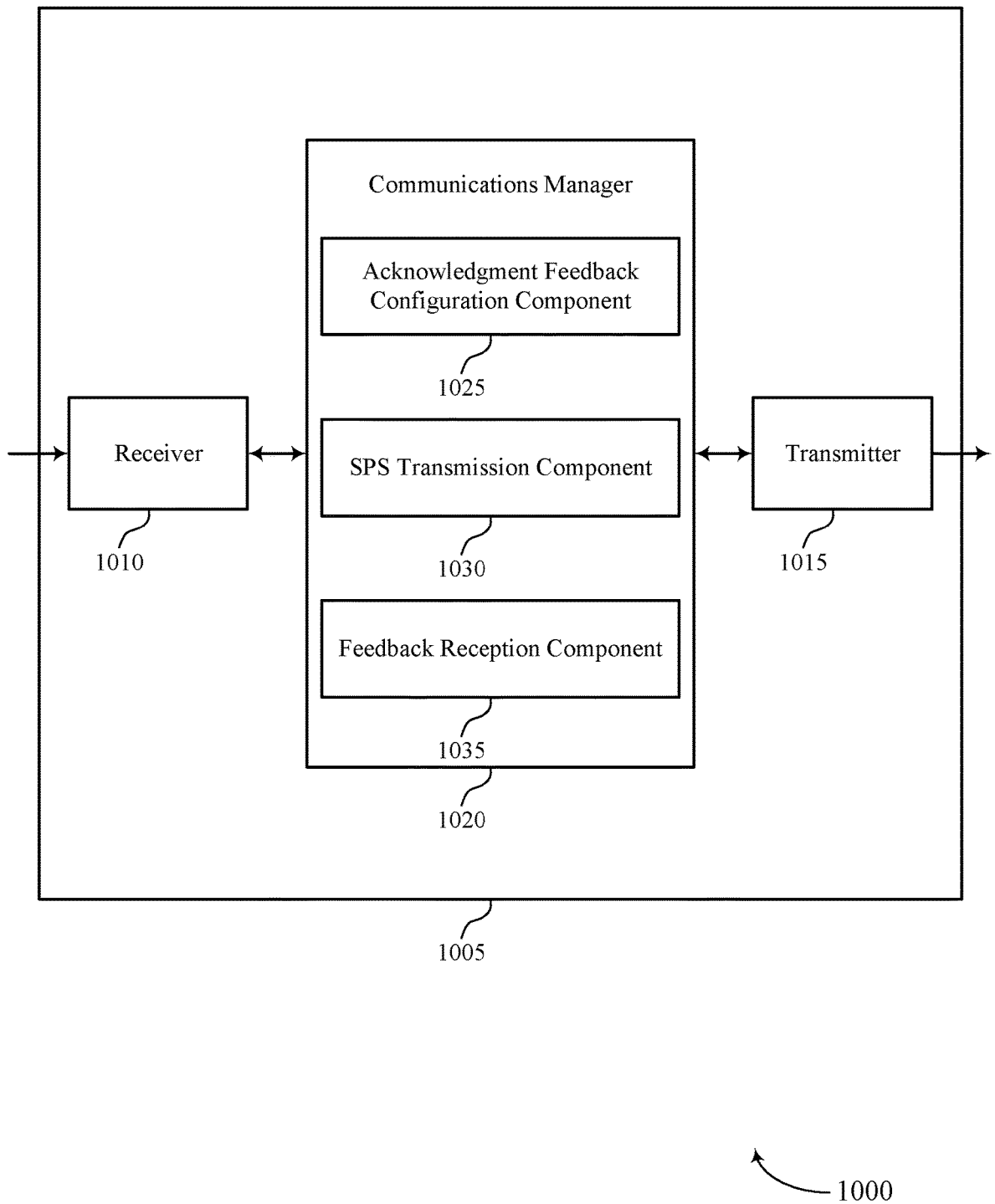

FIG. 10 shows a block diagram 1000 of a device 1005 that supports an acknowledgment feedback configuration for group-common downlink channels with repetitions in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to an acknowledgment feedback configuration for group-common downlink channels with repetitions). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to an acknowledgment feedback configuration for group-common downlink channels with repetitions). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of an acknowledgment feedback configuration for group-common downlink channels with repetitions as described herein. For example, the communications manager 1020 may include an acknowledgment feedback configuration component 1025, an SPS transmission component 1030, a feedback reception component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The acknowledgment feedback configuration component 1025 may be configured as or otherwise support a means for transmitting, to one or more user equipment (UEs), an acknowledgment feedback configuration for providing feedback for a set of multiple downlink shared channels configured for semi-persistent scheduling, the set of multiple downlink shared channels configured for semi-persistent scheduling including one or more sets of unicast semi-persistent downlink shared channels and one or more sets of group-common semi-persistent downlink shared channels, the acknowledgment feedback configuration including either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels. The SPS transmission component 1030 may be configured as or otherwise support a means for transmitting, to at least a first UE of the one or more UEs, at least a first set of group-common semi-persistent downlink shared channels of the set of multiple downlink shared channels configured for semi-persistent scheduling. The feedback reception component 1035 may be configured as or otherwise support a means for receiving, from at least the first UE according to the acknowledgment feedback configuration, an acknowledgment feedback message for at least the first set of group-common semi-persistent downlink shared channels based on the transmitting at least the first set of group-common semi-persistent downlink shared channels.

Figure 11:
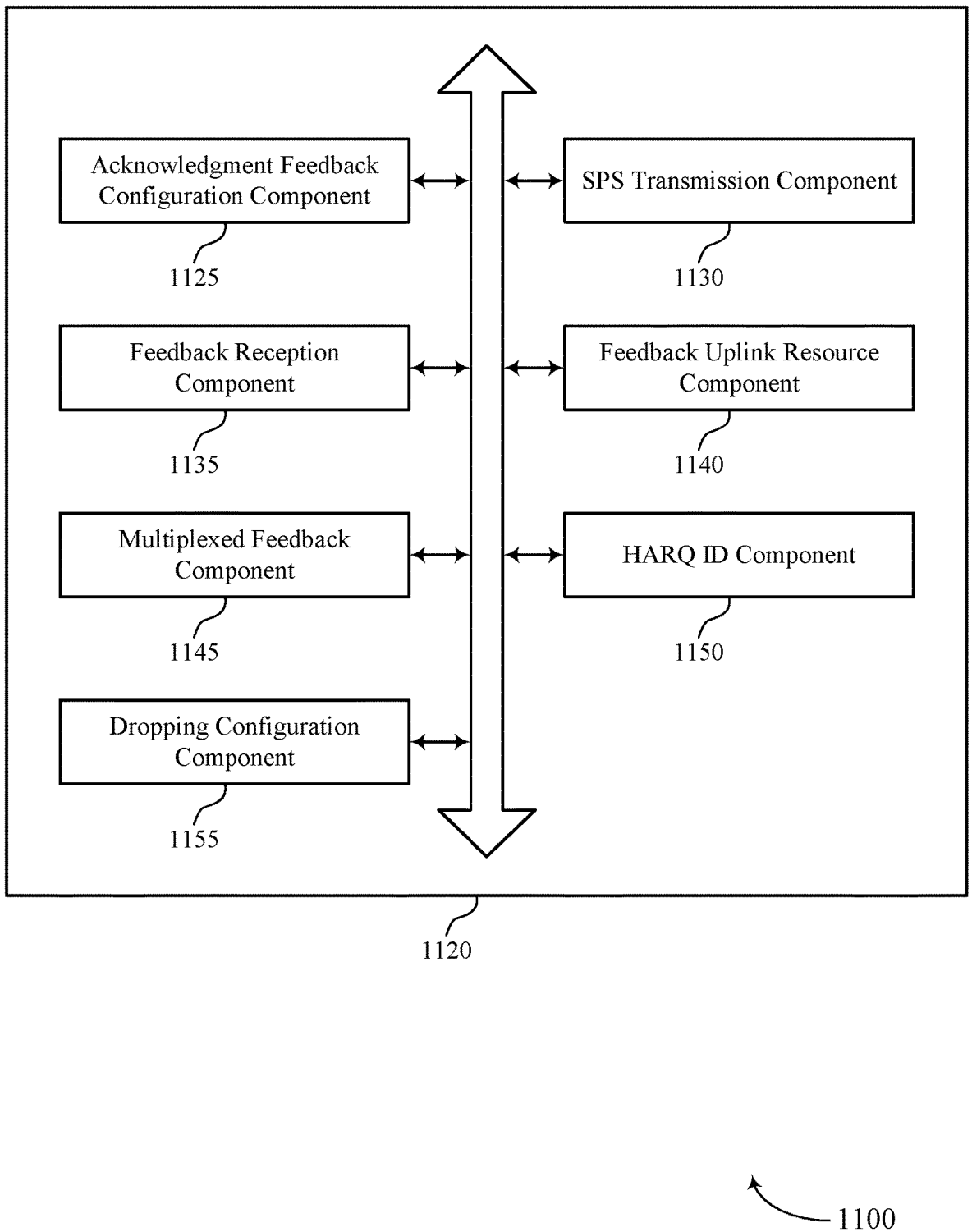
FIG. 11 shows a block diagram of a communications manager that supports an acknowledgment feedback configuration for group-common downlink channels with repetitions in accordance with aspects of the present disclosure.

FIG. 11 shows a block diagram 1100 of a communications manager 1120 that supports an acknowledgment feedback configuration for group-common downlink channels with repetitions in accordance with aspects of the present disclosure. The communications manager 1120 may be an example of aspects of a communications manager 920, a communications manager 1020, or both, as described herein. The communications manager 1120, or various components thereof, may be an example of means for performing various aspects of an acknowledgment feedback configuration for group-common downlink channels with repetitions as described herein. For example, the communications manager 1120 may include an acknowledgment feedback configuration component 1125, an SPS transmission component 1130, a feedback reception component 1135, a feedback uplink resource component 1140, a multiplexed feedback component 1145, an HARQ ID component 1150, a dropping configuration component 1155, or any combination thereof. Each of these components may communicate, directly or indirectly, with one another (e.g., via one or more buses).

The communications manager 1120 may support wireless communications at a base station in accordance with examples as disclosed herein. The acknowledgment feedback configuration component 1125 may be configured as or otherwise support a means for transmitting, to one or more user equipment (UEs), an acknowledgment feedback configuration for providing feedback for a set of multiple downlink shared channels configured for semi-persistent scheduling, the set of multiple downlink shared channels configured for semi-persistent scheduling including one or more sets of unicast semi-persistent downlink shared channels and one or more sets of group-common semi-persistent downlink shared channels, the acknowledgment feedback configuration including either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels. The SPS transmission component 1130 may be configured as or otherwise support a means for transmitting, to at least a first UE of the one or more UEs, at least a first set of group-common semi-persistent downlink shared channels of the set of multiple downlink shared channels configured for semi-persistent scheduling. The feedback reception component 1135 may be configured as or otherwise support a means for receiving, from at least the first UE according to the acknowledgment feedback configuration, an acknowledgment feedback message for at least the first set of group-common semi-persistent downlink shared channels based on the transmitting at least the first set of group-common semi-persistent downlink shared channels.

In some examples, to support transmitting the acknowledgment feedback configuration, the feedback uplink resource component 1140 may be configured as or otherwise support a means for transmitting a first list of uplink control channel resources for the one or more UEs to transmit acknowledgment feedback for the one or more sets of unicast semi-persistent downlink shared channels. In some examples, to support transmitting the acknowledgment feedback configuration, the feedback uplink resource component 1140 may be configured as or otherwise support a means for transmitting a second list of uplink control channel resources for the one or more UEs to transmit acknowledgment feedback for the one or more sets of group-common semi-persistent downlink shared channels, the second list being different than the first list.

In some examples, to support receiving the acknowledgment feedback message, the feedback uplink resource component 1140 may be configured as or otherwise support a means for receiving the acknowledgment feedback message via a first uplink control channel resource from the second list based on a payload size of the acknowledgment feedback message.

In some examples, to support transmitting the acknowledgment feedback configuration, the feedback uplink resource component 1140 may be configured as or otherwise support a means for transmitting a common list of uplink control channel resources for the one or more UEs to transmit acknowledgment feedback for the one or more sets of unicast semi-persistent downlink shared channels and for the one or more sets of group-common semi-persistent downlink shared channels.

In some examples, to support receiving the acknowledgment feedback message, the feedback uplink resource component 1140 may be configured as or otherwise support a means for receiving the acknowledgment feedback message via a first uplink control channel resource from the common list based on a payload size of the acknowledgment feedback message.

In some examples, a size of the common list is different than a size of a list of uplink control channel resources configured for transmitting acknowledgment feedback for the one or more sets of unicast semi-persistent downlink shared channels.

In some examples, to support receiving the acknowledgment feedback message, the feedback reception component 1135 may be configured as or otherwise support a means for receiving the acknowledgment feedback message including a number of bits based on whether acknowledgment feedback for a dynamic downlink shared channel is received with the acknowledgment feedback message.

In some examples, to support receiving the acknowledgment feedback message, the feedback reception component 1135 may be configured as or otherwise support a means for receiving the acknowledgment feedback message according to an acknowledgment codebook that is based on an first order of slots per configuration index of the one or more sets of group-common semi-persistent downlink shared channels in a same serving cell, a second order of configuration indexes of the one or more sets of group-common semi-persistent downlink shared channels in a same serving cell, a third order of serving cell indexes, or a combination thereof.

In some examples, to support receiving the acknowledgment feedback message, the multiplexed feedback component 1145 may be configured as or otherwise support a means for receiving the acknowledgment feedback message based on acknowledgment feedback for at least the first set of group-common semi-persistent downlink shared channels being multiplexed with one or more acknowledgment feedback indications for respective downlink shared channels.

In some examples, the acknowledgment feedback for at least the first set of group-common semi-persistent downlink shared channels is appended after the one or more acknowledgment feedback indications in the acknowledgment feedback message.

In some examples, the one or more acknowledgment feedback indications for respective downlink shared channels include acknowledgment feedback for a dynamic group-common downlink shared channel, for a first release message to release a configuration for a set of semi-persistent group-common downlink shared channels, for a set of unicast downlink shared channel, for a unicast dynamic downlink shared channel, for a second release message to release a set of downlink shared channels, or a combination thereof.

In some examples, to support receiving the acknowledgment feedback message, the HARQ ID component 1150 may be configured as or otherwise support a means for receiving the acknowledgment feedback message based on a hybrid automatic repeat request process identifier for at least the first set of group-common semi-persistent downlink shared channels that is based on a set of parameters configured for a semi-persistent scheduling configuration corresponding to the first set of group-common semi-persistent downlink shared channels.

In some examples, the set of parameters includes a configured scheduling radio network temporary identifier, a periodicity, a number of hybrid automatic repeat request processes, a hybrid automatic repeat request process identifier offset, or a combination thereof, configured for the semi-persistent scheduling configuration.

In some examples, the set of parameters are based on a group radio network temporary identifier configured for the one or more UEs.

In some examples, to support transmitting the acknowledgment feedback configuration, the feedback reception component 1135 may be configured as or otherwise support a means for transmitting a configuration for the set of multiple UEs to transmit either acknowledgment feedback for a set of unicast semi-persistent downlink shared channels or acknowledgment feedback for a set of group-common semi-persistent downlink shared channels in a same uplink control channel.

In some examples, to support transmitting the acknowledgment feedback configuration, the dropping configuration component 1155 may be configured as or otherwise support a means for transmitting a dropping configuration for the set of multiple UEs to drop a first acknowledgment feedback message for a set of unicast semi-persistent downlink shared channels or a second acknowledgment feedback message for a set of group-common semi-persistent downlink shared channels based on the first acknowledgment feedback message and the second acknowledgment feedback message overlapping in a same transmission time interval.

In some examples, to support transmitting the acknowledgment feedback configuration, the multiplexed feedback component 1145 may be configured as or otherwise support a means for transmitting a multiplexing configuration for the set of multiple UEs to multiplex acknowledgment feedback for the one or more sets of unicast semi-persistent downlink shared channels and for the one or more sets of group-common semi-persistent downlink shared channels in a same uplink control channel.

Figure 12:
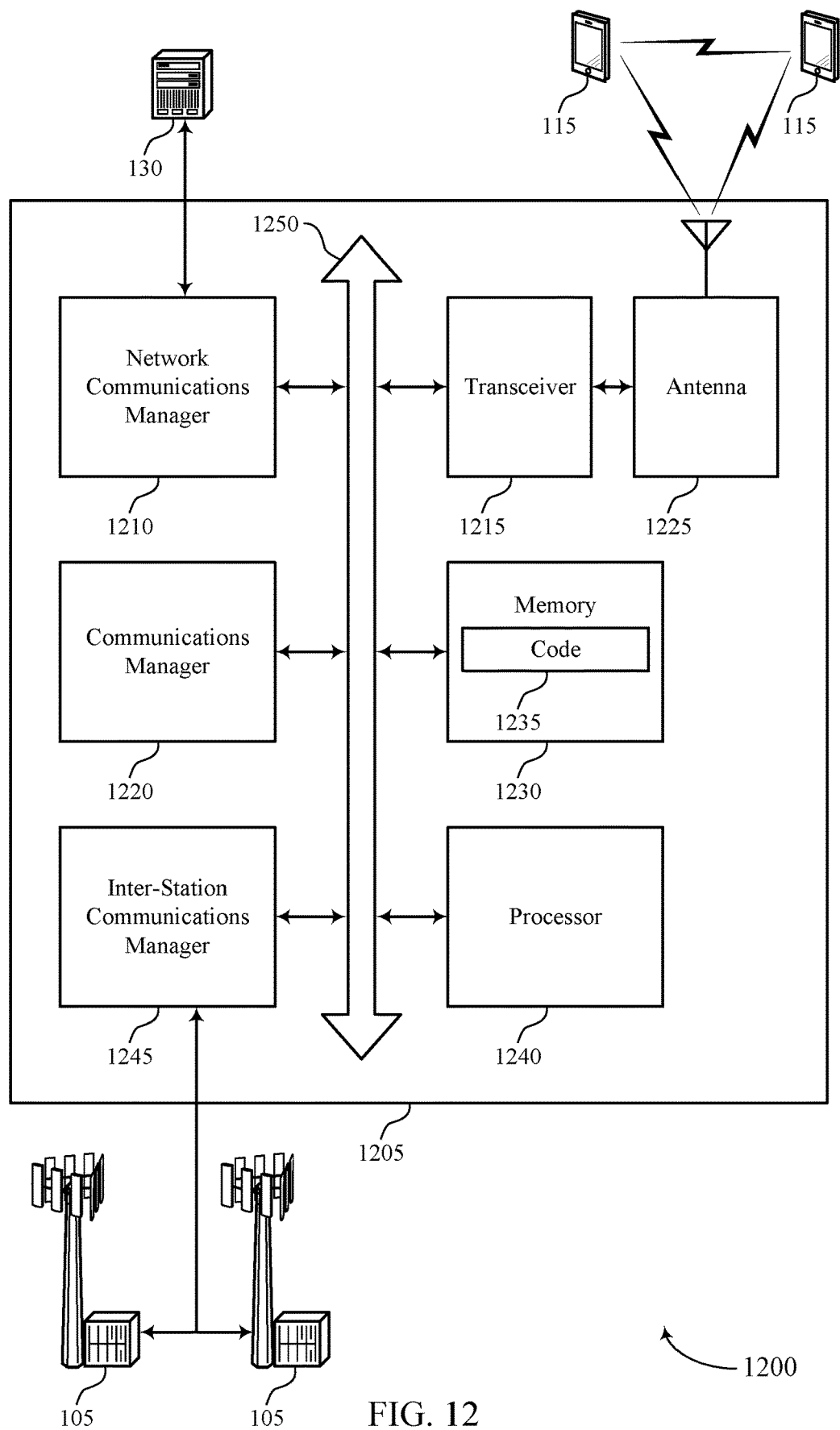
FIG. 12 shows a diagram of a system including a device that supports an acknowledgment feedback configuration for group-common downlink channels with repetitions in accordance with aspects of the present disclosure.

FIG. 12 shows a diagram of a system 1200 including a device 1205 that supports an acknowledgment feedback configuration for group-common downlink channels with repetitions in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting an acknowledgment feedback configuration for group-common downlink channels with repetitions). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting, to one or more user equipment (UEs), an acknowledgment feedback configuration for providing feedback for a set of multiple downlink shared channels configured for semi-persistent scheduling, the set of multiple downlink shared channels configured for semi-persistent scheduling including one or more sets of unicast semi-persistent downlink shared channels and one or more sets of group-common semi-persistent downlink shared channels, the acknowledgment feedback configuration including either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels. The communications manager 1220 may be configured as or otherwise support a means for transmitting, to at least a first UE of the one or more UEs, at least a first set of group-common semi-persistent downlink shared channels of the set of multiple downlink shared channels configured for semi-persistent scheduling. The communications manager 1220 may be configured as or otherwise support a means for receiving, from at least the first UE according to the acknowledgment feedback configuration, an acknowledgment feedback message for at least the first set of group-common semi-persistent downlink shared channels based on the transmitting at least the first set of group-common semi-persistent downlink shared channels.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of an acknowledgment feedback configuration for group-common downlink channels with repetitions as described herein, or the processor 1240 and the memory 1230 may be otherwise configured to perform or support such operations.

Figure 13:
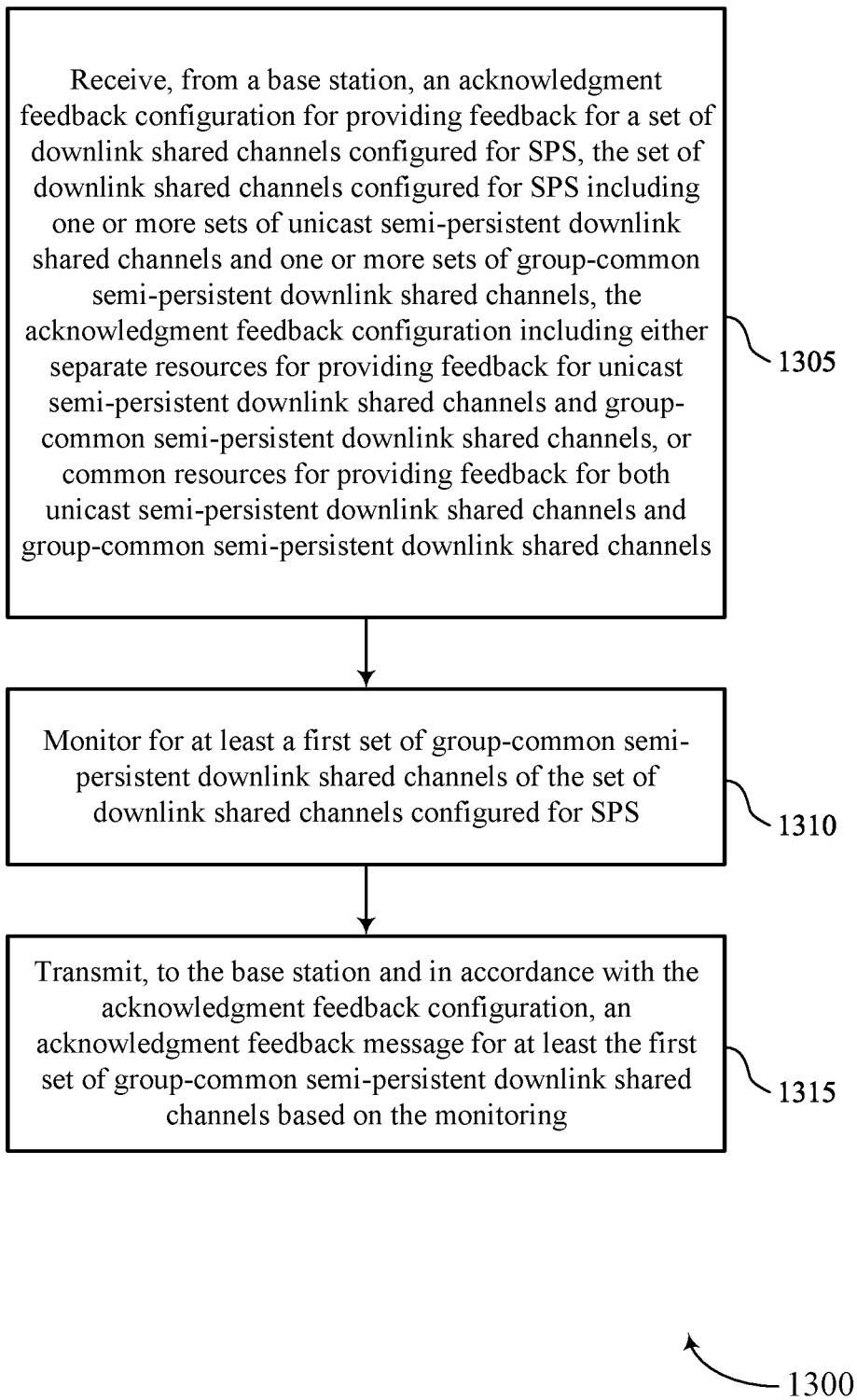
FIGS. 13 through 19 show flowcharts illustrating methods that support an acknowledgment feedback configuration for group-common downlink channels with repetitions in accordance with aspects of the present disclosure.

FIG. 13 shows a flowchart illustrating a method 1300 that supports an acknowledgment feedback configuration for group-common downlink channels with repetitions in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, an acknowledgment feedback configuration for providing feedback for a set of multiple downlink shared channels configured for semi-persistent scheduling, the set of multiple downlink shared channels configured for semi-persistent scheduling including one or more sets of unicast semi-persistent downlink shared channels and one or more sets of group-common semi-persistent downlink shared channels, the acknowledgment feedback configuration including either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels. The operations of 1305 may be performed in accordance with examples as disclosed herein. In some examples, aspects of the operations of 1305 may be performed by an acknowledgment feedback configuration component 725 as described with reference to FIG. 7.

At 1310, the method may include monitoring for at least a first set of group-common semi-persistent downlink shared channels of the set of multiple downlink shared channels configured for semi-persistent scheduling. The operations of 1310 may be performed in accordance with examples as disclosed herein. In some examples, aspects of the operations of 1310 may be performed by an SPS monitoring component 730 as described with reference to FIG. 7.

At 1315, the method may include transmitting, to the base station and in accordance with the acknowledgment feedback configuration, an acknowledgment feedback message for at least the first set of group-common semi-persistent downlink shared channels based on the monitoring. The operations of 1315 may be performed in accordance with examples as disclosed herein. In some examples, aspects of the operations of 1315 may be performed by an acknowledgment feedback component 735 as described with reference to FIG. 7.

Figure 14:
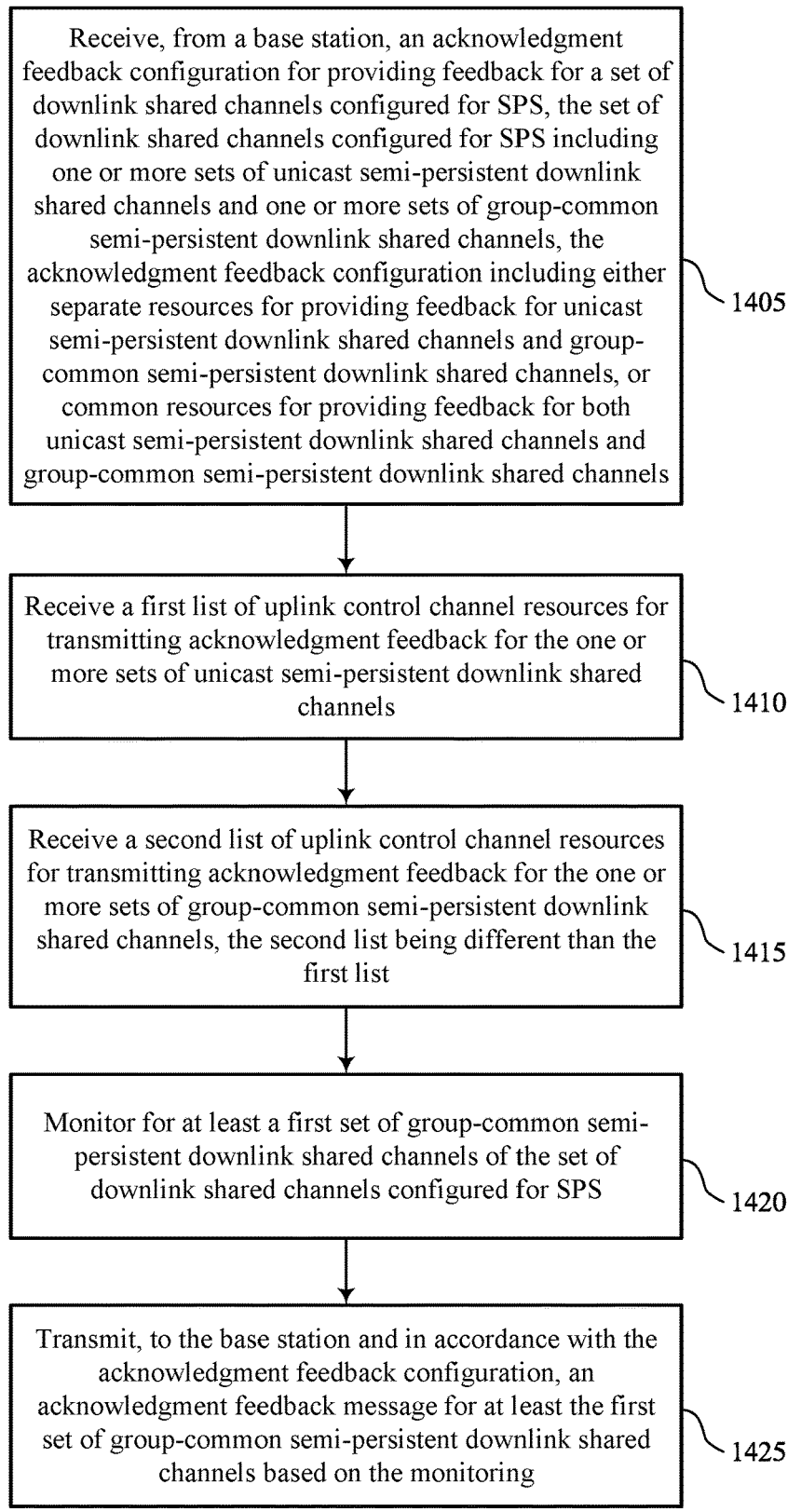

FIG. 14 shows a flowchart illustrating a method 1400 that supports an acknowledgment feedback configuration for group-common downlink channels with repetitions in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, an acknowledgment feedback configuration for providing feedback for a set of multiple downlink shared channels configured for semi-persistent scheduling, the set of multiple downlink shared channels configured for semi-persistent scheduling including one or more sets of unicast semi-persistent downlink shared channels and one or more sets of group-common semi-persistent downlink shared channels, the acknowledgment feedback configuration including either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels. The operations of 1405 may be performed in accordance with examples as disclosed herein. In some examples, aspects of the operations of 1405 may be performed by an acknowledgment feedback configuration component 725 as described with reference to FIG. 7.

At 1410, the method may include receiving a first list of uplink control channel resources for transmitting acknowledgment feedback for the one or more sets of unicast semi-persistent downlink shared channels. The operations of 1410 may be performed in accordance with examples as disclosed herein. In some examples, aspects of the operations of 1410 may be performed by an acknowledgment uplink resource component 740 as described with reference to FIG. 7.

At 1415, the method may include receiving a second list of uplink control channel resources for transmitting acknowledgment feedback for the one or more sets of group-common semi-persistent downlink shared channels, the second list being different than the first list. The operations of 1415 may be performed in accordance with examples as disclosed herein. In some examples, aspects of the operations of 1415 may be performed by an acknowledgment uplink resource component 740 as described with reference to FIG. 7.

At 1420, the method may include monitoring for at least a first set of group-common semi-persistent downlink shared channels of the set of multiple downlink shared channels configured for semi-persistent scheduling. The operations of 1420 may be performed in accordance with examples as disclosed herein. In some examples, aspects of the operations of 1420 may be performed by an SPS monitoring component 730 as described with reference to FIG. 7.

At 1425, the method may include transmitting, to the base station and in accordance with the acknowledgment feedback configuration, an acknowledgment feedback message for at least the first set of group-common semi-persistent downlink shared channels based on the monitoring. The operations of 1425 may be performed in accordance with examples as disclosed herein. In some examples, aspects of the operations of 1425 may be performed by an acknowledgment feedback component 735 as described with reference to FIG. 7.

Figure 15:
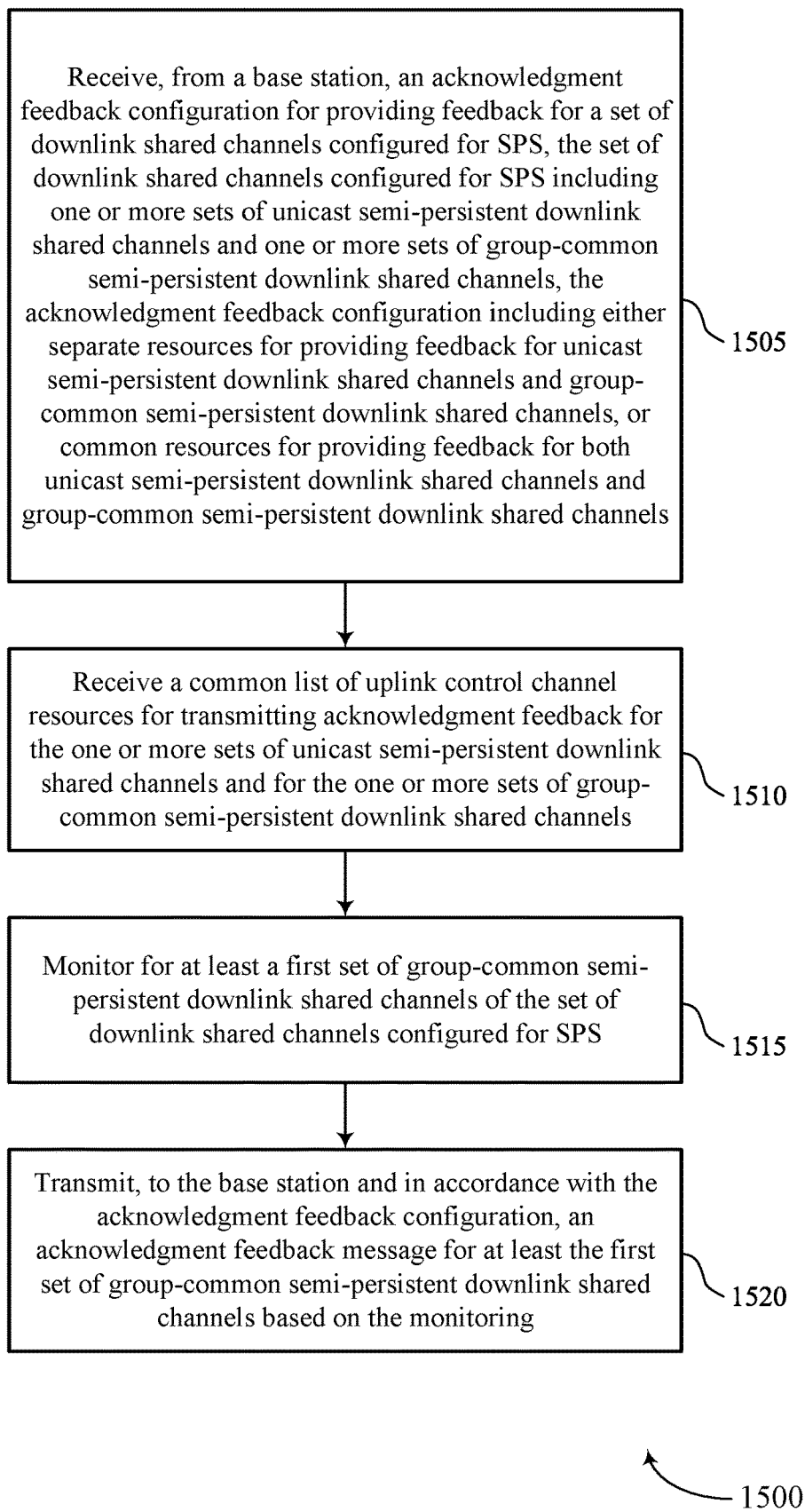

FIG. 15 shows a flowchart illustrating a method 1500 that supports an acknowledgment feedback configuration for group-common downlink channels with repetitions in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, an acknowledgment feedback configuration for providing feedback for a set of multiple downlink shared channels configured for semi-persistent scheduling, the set of multiple downlink shared channels configured for semi-persistent scheduling including one or more sets of unicast semi-persistent downlink shared channels and one or more sets of group-common semi-persistent downlink shared channels, the acknowledgment feedback configuration including either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels. The operations of 1505 may be performed in accordance with examples as disclosed herein. In some examples, aspects of the operations of 1505 may be performed by an acknowledgment feedback configuration component 725 as described with reference to FIG. 7.

At 1510, the method may include receiving a common list of uplink control channel resources for transmitting acknowledgment feedback for the one or more sets of unicast semi-persistent downlink shared channels and for the one or more sets of group-common semi-persistent downlink shared channels. The operations of 1510 may be performed in accordance with examples as disclosed herein. In some examples, aspects of the operations of 1510 may be performed by an acknowledgment uplink resource component 740 as described with reference to FIG. 7.

At 1515, the method may include monitoring for at least a first set of group-common semi-persistent downlink shared channels of the set of multiple downlink shared channels configured for semi-persistent scheduling. The operations of 1515 may be performed in accordance with examples as disclosed herein. In some examples, aspects of the operations of 1515 may be performed by an SPS monitoring component 730 as described with reference to FIG. 7.

At 1520, the method may include transmitting, to the base station and in accordance with the acknowledgment feedback configuration, an acknowledgment feedback message for at least the first set of group-common semi-persistent downlink shared channels based on the monitoring. The operations of 1520 may be performed in accordance with examples as disclosed herein. In some examples, aspects of the operations of 1520 may be performed by an acknowledgment feedback component 735 as described with reference to FIG. 7.

Figure 16:
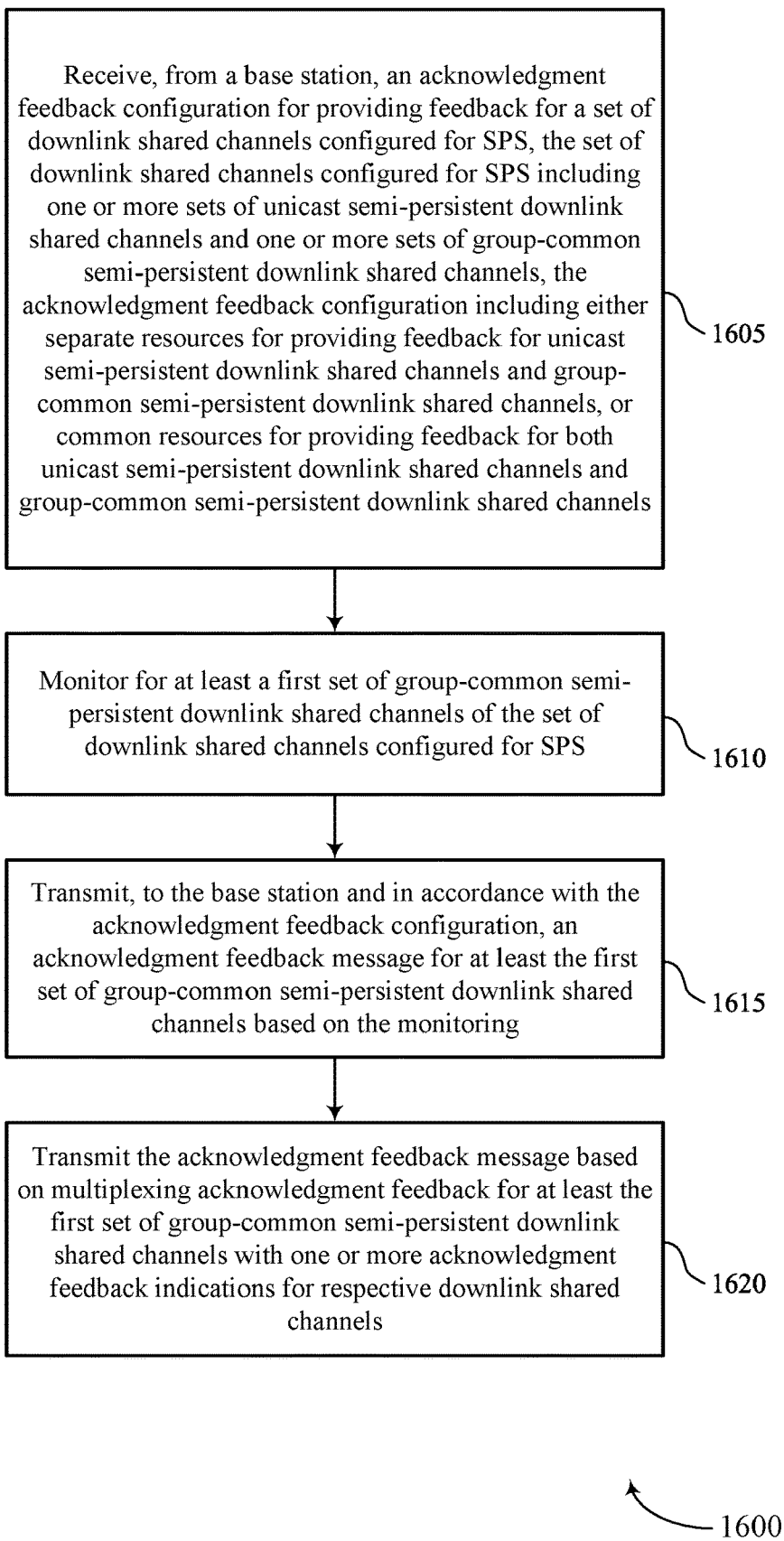

FIG. 16 shows a flowchart illustrating a method 1600 that supports an acknowledgment feedback configuration for group-common downlink channels with repetitions in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, an acknowledgment feedback configuration for providing feedback for a set of multiple downlink shared channels configured for semi-persistent scheduling, the set of multiple downlink shared channels configured for semi-persistent scheduling including one or more sets of unicast semi-persistent downlink shared channels and one or more sets of group-common semi-persistent downlink shared channels, the acknowledgment feedback configuration including either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels. The operations of 1605 may be performed in accordance with examples as disclosed herein. In some examples, aspects of the operations of 1605 may be performed by an acknowledgment feedback configuration component 725 as described with reference to FIG. 7.

At 1610, the method may include monitoring for at least a first set of group-common semi-persistent downlink shared channels of the set of multiple downlink shared channels configured for semi-persistent scheduling. The operations of 1610 may be performed in accordance with examples as disclosed herein. In some examples, aspects of the operations of 1610 may be performed by an SPS monitoring component 730 as described with reference to FIG. 7.

At 1615, the method may include transmitting, to the base station and in accordance with the acknowledgment feedback configuration, an acknowledgment feedback message for at least the first set of group-common semi-persistent downlink shared channels based on the monitoring. The operations of 1615 may be performed in accordance with examples as disclosed herein. In some examples, aspects of the operations of 1615 may be performed by an acknowledgment feedback component 735 as described with reference to FIG. 7.

At 1620, the method may include transmitting the acknowledgment feedback message based on multiplexing acknowledgment feedback for at least the first set of group-common semi-persistent downlink shared channels with one or more acknowledgment feedback indications for respective downlink shared channels. The operations of 1620 may be performed in accordance with examples as disclosed herein. In some examples, aspects of the operations of 1620 may be performed by a multiplexed feedback component 745 as described with reference to FIG. 7.

Figure 17:
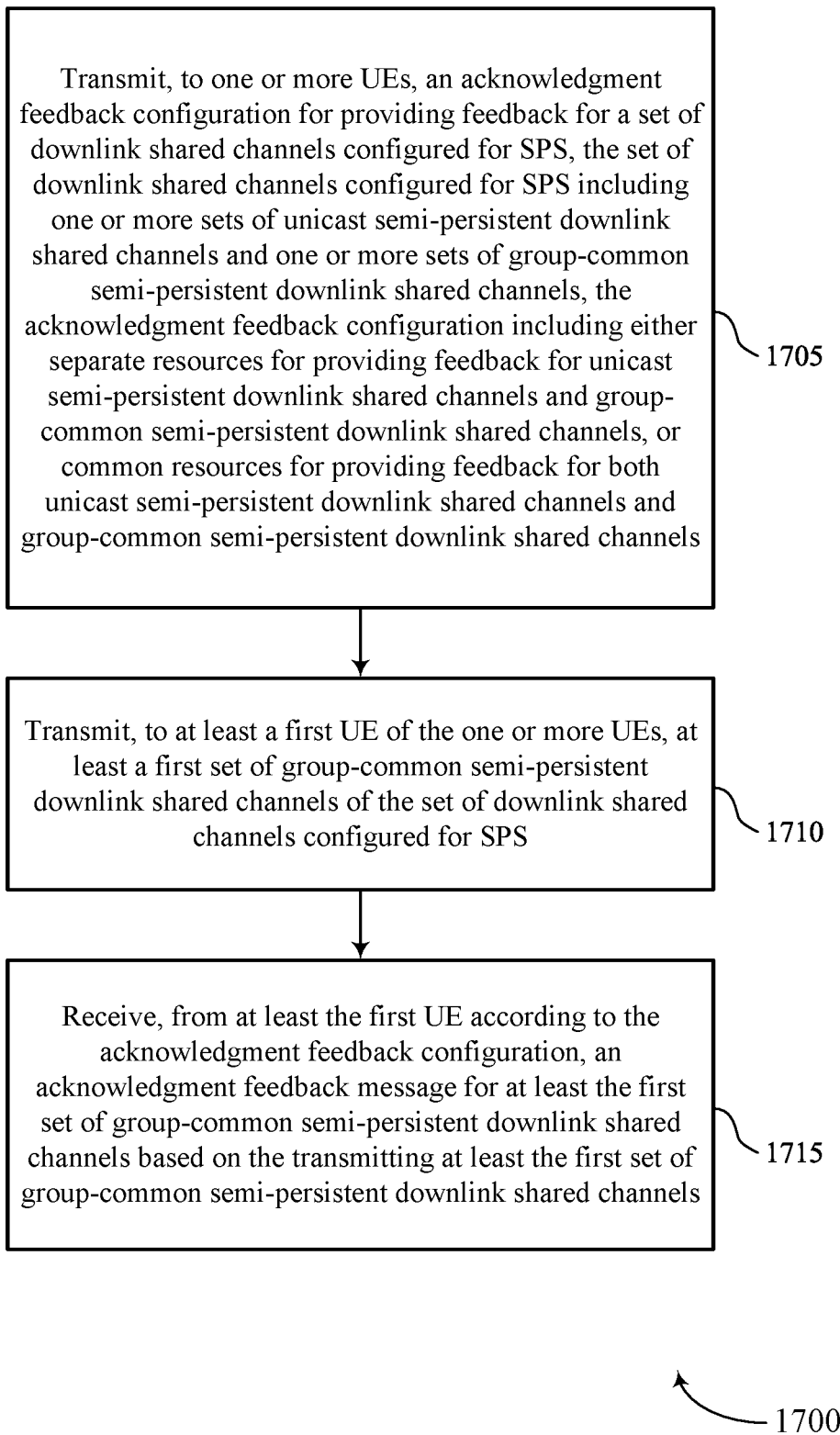

FIG. 17 shows a flowchart illustrating a method 1700 that supports an acknowledgment feedback configuration for group-common downlink channels with repetitions in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include transmitting, to one or more UEs, an acknowledgment feedback configuration for providing feedback for a set of multiple downlink shared channels configured for semi-persistent scheduling, the set of multiple downlink shared channels configured for semi-persistent scheduling including one or more sets of unicast semi-persistent downlink shared channels and one or more sets of group-common semi-persistent downlink shared channels, the acknowledgment feedback configuration including either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels. The operations of 1705 may be performed in accordance with examples as disclosed herein. In some examples, aspects of the operations of 1705 may be performed by an acknowledgment feedback configuration component 1125 as described with reference to FIG. 11.

At 1710, the method may include transmitting, to at least a first UE of the one or more UEs, at least a first set of group-common semi-persistent downlink shared channels of the set of multiple downlink shared channels configured for semi-persistent scheduling. The operations of 1710 may be performed in accordance with examples as disclosed herein. In some examples, aspects of the operations of 1710 may be performed by an SPS transmission component 1130 as described with reference to FIG. 11.

At 1715, the method may include receiving, from at least the first UE according to the acknowledgment feedback configuration, an acknowledgment feedback message for at least the first set of group-common semi-persistent downlink shared channels based on the transmitting at least the first set of group-common semi-persistent downlink shared channels. The operations of 1715 may be performed in accordance with examples as disclosed herein. In some examples, aspects of the operations of 1715 may be performed by a feedback reception component 1135 as described with reference to FIG. 11.

Figure 18:
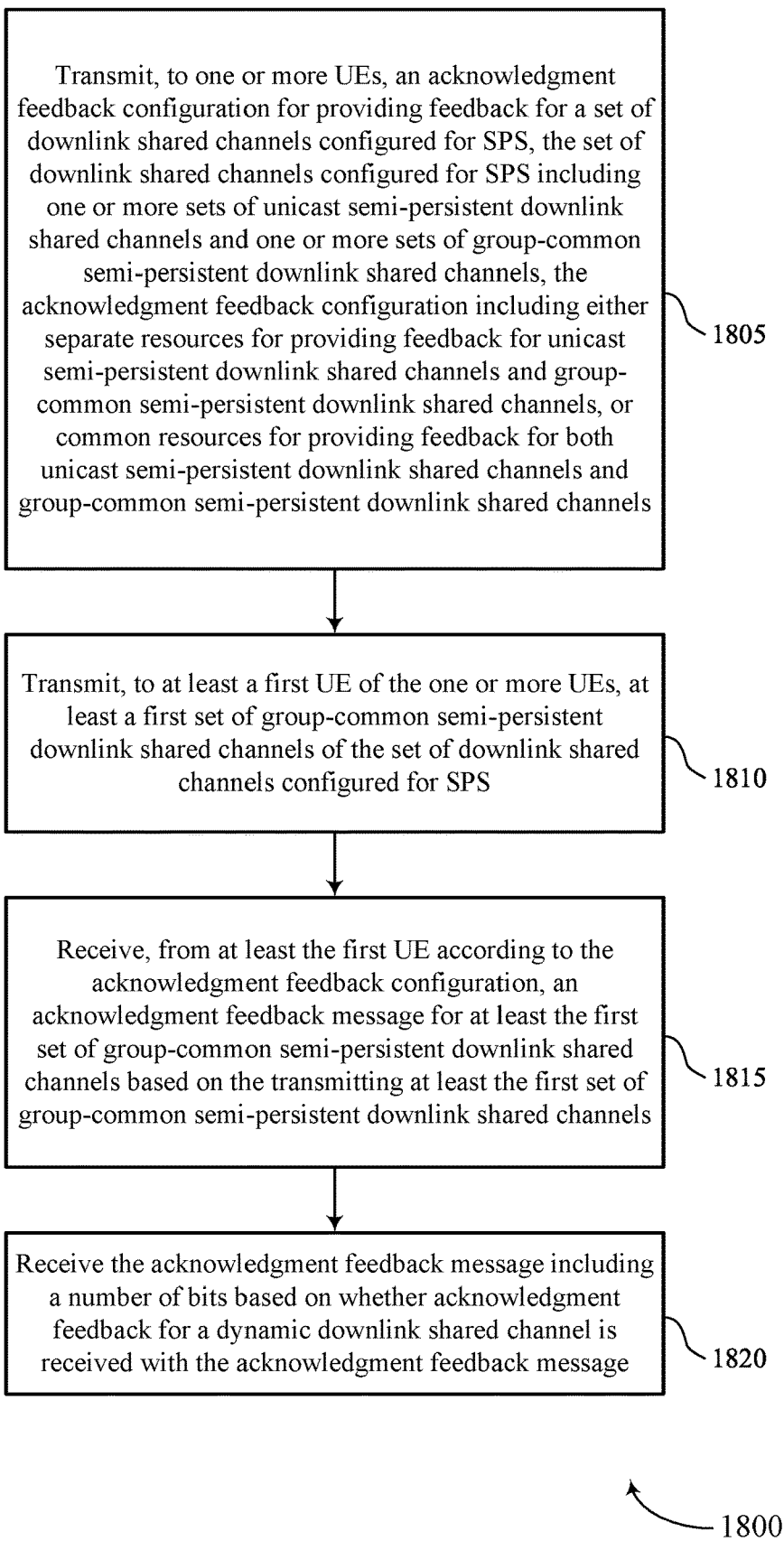

FIG. 18 shows a flowchart illustrating a method 1800 that supports an acknowledgment feedback configuration for group-common downlink channels with repetitions in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include transmitting, to one or more UEs, an acknowledgment feedback configuration for providing feedback for a set of multiple downlink shared channels configured for semi-persistent scheduling, the set of multiple downlink shared channels configured for semi-persistent scheduling including one or more sets of unicast semi-persistent downlink shared channels and one or more sets of group-common semi-persistent downlink shared channels, the acknowledgment feedback configuration including either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels. The operations of 1805 may be performed in accordance with examples as disclosed herein. In some examples, aspects of the operations of 1805 may be performed by an acknowledgment feedback configuration component 1125 as described with reference to FIG. 11.

At 1810, the method may include transmitting, to at least a first UE of the one or more UEs, at least a first set of group-common semi-persistent downlink shared channels of the set of multiple downlink shared channels configured for semi-persistent scheduling. The operations of 1810 may be performed in accordance with examples as disclosed herein. In some examples, aspects of the operations of 1810 may be performed by an SPS transmission component 1130 as described with reference to FIG. 11.

At 1815, the method may include receiving, from at least the first UE according to the acknowledgment feedback configuration, an acknowledgment feedback message for at least the first set of group-common semi-persistent downlink shared channels based on the transmitting at least the first set of group-common semi-persistent downlink shared channels. The operations of 1815 may be performed in accordance with examples as disclosed herein. In some examples, aspects of the operations of 1815 may be performed by a feedback reception component 1135 as described with reference to FIG. 11.

At 1820, the method may include receiving the acknowledgment feedback message including a number of bits based on whether acknowledgment feedback for a dynamic downlink shared channel is received with the acknowledgment feedback message. The operations of 1820 may be performed in accordance with examples as disclosed herein. In some examples, aspects of the operations of 1820 may be performed by a feedback reception component 1135 as described with reference to FIG. 11.

Figure 19:
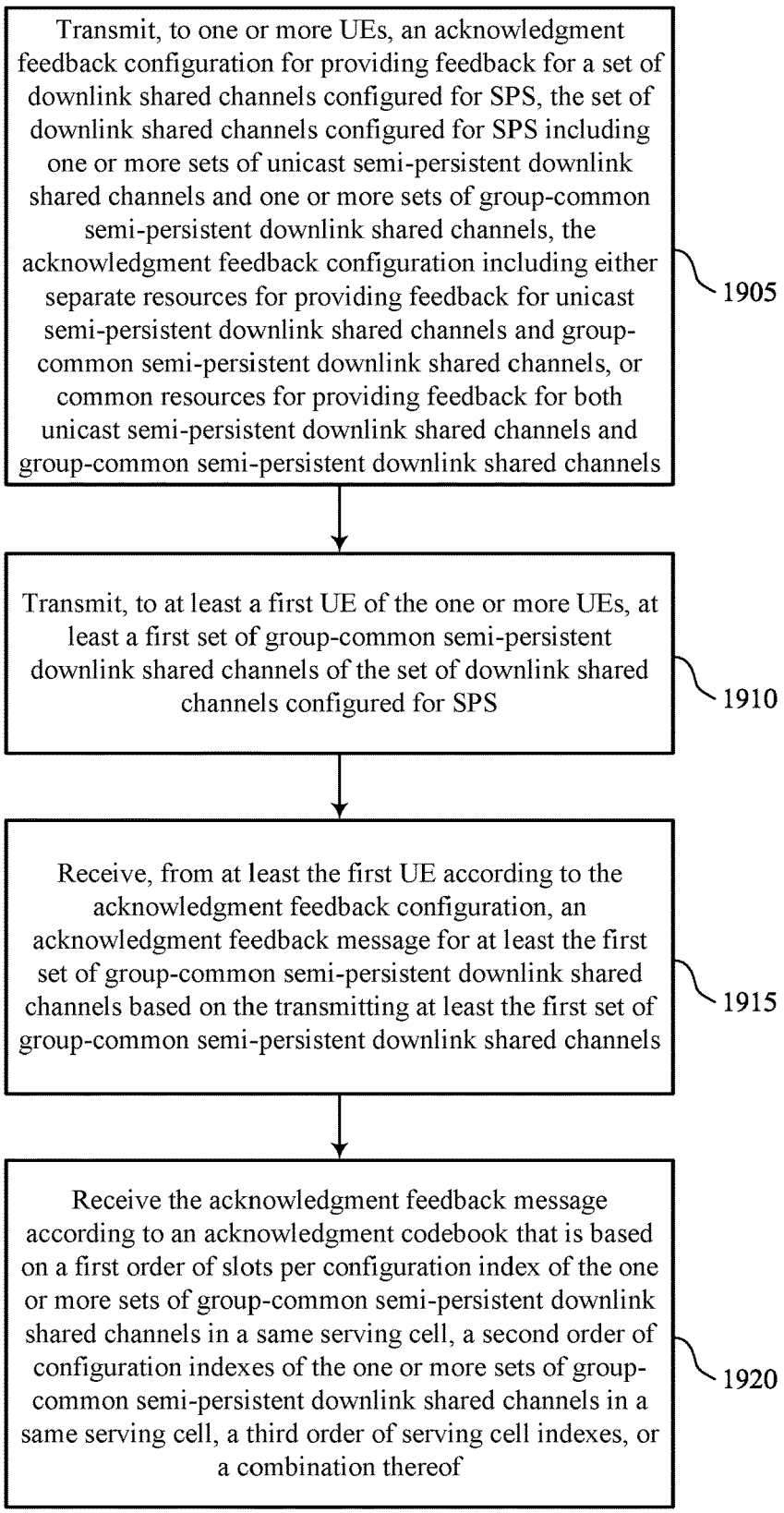

FIG. 19 shows a flowchart illustrating a method 1900 that supports an acknowledgment feedback configuration for group-common downlink channels with repetitions in accordance with aspects of the present disclosure. The operations of the method 1900 may be implemented by a base station or its components as described herein. For example, the operations of the method 1900 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1905, the method may include transmitting, to one or more UEs, an acknowledgment feedback configuration for providing feedback for a set of multiple downlink shared channels configured for semi-persistent scheduling, the set of multiple downlink shared channels configured for semi-persistent scheduling including one or more sets of unicast semi-persistent downlink shared channels and one or more sets of group-common semi-persistent downlink shared channels, the acknowledgment feedback configuration including either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels. The operations of 1905 may be performed in accordance with examples as disclosed herein. In some examples, aspects of the operations of 1905 may be performed by an acknowledgment feedback configuration component 1125 as described with reference to FIG. 11.

At 1910, the method may include transmitting, to at least a first UE of the one or more UEs, at least a first set of group-common semi-persistent downlink shared channels of the set of multiple downlink shared channels configured for semi-persistent scheduling. The operations of 1910 may be performed in accordance with examples as disclosed herein. In some examples, aspects of the operations of 1910 may be performed by an SPS transmission component 1130 as described with reference to FIG. 11.

At 1915, the method may include receiving, from at least the first UE according to the acknowledgment feedback configuration, an acknowledgment feedback message for at least the first set of group-common semi-persistent downlink shared channels based on the transmitting at least the first set of group-common semi-persistent downlink shared channels. The operations of 1915 may be performed in accordance with examples as disclosed herein. In some examples, aspects of the operations of 1915 may be performed by a feedback reception component 1135 as described with reference to FIG. 11.

At 1920, the method may include receiving the acknowledgment feedback message according to an acknowledgment codebook that is based on an first order of slots per configuration index of the one or more sets of group-common semi-persistent downlink shared channels in a same serving cell, a second order of configuration indexes of the one or more sets of group-common semi-persistent downlink shared channels in a same serving cell, a third order of serving cell indexes, or a combination thereof. The operations of 1920 may be performed in accordance with examples as disclosed herein. In some examples, aspects of the operations of 1920 may be performed by a feedback reception component 1135 as described with reference to FIG. 11.

The following provides an overview of aspects of the present disclosure:

Aspect 1: A method for wireless communications at a UE, comprising: receiving, from a base station, an acknowledgment feedback configuration for providing feedback for a plurality of downlink shared channels configured for semi-persistent scheduling, the plurality of downlink shared channels configured for semi-persistent scheduling comprising one or more sets of unicast semi-persistent downlink shared channels and one or more sets of group-common semi-persistent downlink shared channels, the acknowledgment feedback configuration comprising either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels; monitoring for at least a first set of group-common semi-persistent downlink shared channels of the plurality of downlink shared channels configured for semi-persistent scheduling; and transmitting, to the base station and in accordance with the acknowledgment feedback configuration, an acknowledgment feedback message for at least the first set of group-common semi-persistent downlink shared channels based at least in part on the monitoring.

Aspect 2: The method of aspect 1, wherein receiving the acknowledgment feedback configuration comprises: receiving a first list of uplink control channel resources for transmitting acknowledgment feedback for the one or more sets of unicast semi-persistent downlink shared channels; and receiving a second list of uplink control channel resources for transmitting acknowledgment feedback for the one or more sets of group-common semi-persistent downlink shared channels, the second list being different than the first list.

Aspect 3: The method of aspect 2, further comprising: determining a first uplink control channel resource from the second list to transmit the acknowledgment feedback message based at least in part on a payload size of the acknowledgment feedback message.

Aspect 4: The method of aspect 1, wherein receiving the acknowledgment feedback configuration comprises: receiving a common list of uplink control channel resources for transmitting acknowledgment feedback for the one or more sets of unicast semi-persistent downlink shared channels and for the one or more sets of group-common semi-persistent downlink shared channels.

Aspect 5: The method of aspect 4, further comprising: determining a first uplink control channel resource from the common list to transmit the acknowledgment feedback message based at least in part on a payload size of the acknowledgment feedback message.

Aspect 6: The method of any of aspects 4 through 5, wherein a size of the common list is different than a size of a list of uplink control channel resources configured for transmitting acknowledgment feedback for the one or more sets of unicast semi-persistent downlink shared channels.

Aspect 7: The method of any of aspects 1 through 6, further comprising: determining a number of bits to transmit in the acknowledgment feedback message based at least in part on whether acknowledgment feedback for a dynamic downlink shared channel is to be transmitted at a same time as the acknowledgment feedback message for one or more semi-persistent downlink shared channels.

Aspect 8: The method of any of aspects 1 through 7, further comprising: determining an acknowledgment codebook for transmitting the acknowledgment feedback message based at least in part on a first order of slots per configuration index of the one or more sets of group-common semi-persistent downlink shared channels in a same serving cell, a second order of configuration indexes of the one or more sets of group-common semi-persistent downlink shared channels in a same serving cell, a third order of serving cell indexes, or a combination thereof.

Aspect 9: The method of any of aspects 1 through 8, wherein transmitting the acknowledgment feedback message comprises: transmitting the acknowledgment feedback message based at least in part on multiplexing acknowledgment feedback for at least the first set of group-common semi-persistent downlink shared channels with one or more acknowledgment feedback indications for respective downlink shared channels.

Aspect 10: The method of aspect 9, wherein the acknowledgment feedback for at least the first set of group-common semi-persistent downlink shared channels is appended after the one or more acknowledgment feedback indications in the acknowledgment feedback message.

Aspect 11: The method of any of aspects 9 through 10, wherein the one or more acknowledgment feedback indications for respective downlink shared channels comprise acknowledgment feedback for a dynamic group-common downlink shared channel, for a first release message to release a configuration for a set of semi-persistent group-common downlink shared channels, for a set of unicast downlink shared channel, for a unicast dynamic downlink shared channel, for a second release message to release a set of downlink shared channels, or a combination thereof.

Aspect 12: The method of any of aspects 1 through 11, further comprising: determining a hybrid automatic repeat request process identifier for transmitting the acknowledgment feedback message for at least the first set of group-common semi-persistent downlink shared channels based at least in part on a set of parameters configured for a semi-persistent scheduling configuration corresponding to the first set of group-common semi-persistent downlink shared channels.

Aspect 13: The method of aspect 12, wherein the set of parameters comprises a configured scheduling radio network temporary identifier, a periodicity, a number of hybrid automatic repeat request processes, a hybrid automatic repeat request process identifier offset, or a combination thereof, configured for the semi-persistent scheduling configuration.

Aspect 14: The method of any of aspects 12 through 13, wherein the set of parameters are determined based at least in part on a group radio network temporary identifier configured for a group of UEs comprising the UE.

Aspect 15: The method of any of aspects 1 through 14, wherein receiving the acknowledgment feedback configuration comprises: receiving a configuration for transmitting either acknowledgment feedback for a set of unicast semi-persistent downlink shared channels or acknowledgment feedback for a set of group-common semi-persistent downlink shared channels in a same uplink control channel.

Aspect 16: The method of any of aspects 1 through 15, wherein receiving the acknowledgment feedback configuration comprises: receiving a dropping configuration for dropping a first acknowledgment feedback message for a set of unicast semi-persistent downlink shared channels or a second acknowledgment feedback message for a set of group-common semi-persistent downlink shared channels based at least in part on the first acknowledgment feedback message and the second acknowledgment feedback message overlapping in a same transmission time interval.

Aspect 17: The method of any of aspects 1 through 16, wherein receiving the acknowledgment feedback configuration comprises: receiving a multiplexing configuration for multiplexing acknowledgment feedback for the one or more sets of unicast semi-persistent downlink shared channels and for the one or more sets of group-common semi-persistent downlink shared channels in a same uplink control channel.

Aspect 18: A method for wireless communications at a base station, comprising: transmitting, to one or more user equipment (UEs), an acknowledgment feedback configuration for providing feedback for a plurality of downlink shared channels configured for semi-persistent scheduling, the plurality of downlink shared channels configured for semi-persistent scheduling comprising one or more sets of unicast semi-persistent downlink shared channels and one or more sets of group-common semi-persistent downlink shared channels, the acknowledgment feedback configuration comprising either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels; transmitting, to at least a first UE of the one or more UEs, at least a first set of group-common semi-persistent downlink shared channels of the plurality of downlink shared channels configured for semi-persistent scheduling; and receiving, from at least the first UE according to the acknowledgment feedback configuration, an acknowledgment feedback message for at least the first set of group-common semi-persistent downlink shared channels based at least in part on the transmitting at least the first set of group-common semi-persistent downlink shared channels.

Aspect 19: The method of aspect 18, wherein transmitting the acknowledgment feedback configuration comprises: transmitting a first list of uplink control channel resources for the one or more UEs to transmit acknowledgment feedback for the one or more sets of unicast semi-persistent downlink shared channels; and transmitting a second list of uplink control channel resources for the one or more UEs to transmit acknowledgment feedback for the one or more sets of group-common semi-persistent downlink shared channels, the second list being different than the first list.

Aspect 20: The method of aspect 19, wherein receiving the acknowledgment feedback message comprises: receiving the acknowledgment feedback message via a first uplink control channel resource from the second list based at least in part on a payload size of the acknowledgment feedback message.

Aspect 21: The method of aspect 18, wherein transmitting the acknowledgment feedback configuration comprises: transmitting a common list of uplink control channel resources for the one or more UEs to transmit acknowledgment feedback for the one or more sets of unicast semi-persistent downlink shared channels and for the one or more sets of group-common semi-persistent downlink shared channels.

Aspect 22: The method of aspect 21, wherein receiving the acknowledgment feedback message comprises: receiving the acknowledgment feedback message via a first uplink control channel resource from the common list based at least in part on a payload size of the acknowledgment feedback message.

Aspect 23: The method of any of aspects 21 through 22, wherein a size of the common list is different than a size of a list of uplink control channel resources configured for transmitting acknowledgment feedback for the one or more sets of unicast semi-persistent downlink shared channels.

Aspect 24: The method of any of aspects 18 through 23, wherein receiving the acknowledgment feedback message comprises: receiving the acknowledgment feedback message comprising a number of bits based at least in part on whether acknowledgment feedback for a dynamic downlink shared channel is received with the acknowledgment feedback message.

Aspect 25: The method of any of aspects 18 through 24, wherein receiving the acknowledgment feedback message comprises: receiving the acknowledgment feedback message according to an acknowledgment codebook that is based at least in part on an first order of slots per configuration index of the one or more sets of group-common semi-persistent downlink shared channels in a same serving cell, a second order of configuration indexes of the one or more sets of group-common semi-persistent downlink shared channels in a same serving cell, a third order of serving cell indexes, or a combination thereof.

Aspect 26: The method of any of aspects 18 through 25, wherein receiving the acknowledgment feedback message comprises: receiving the acknowledgment feedback message based at least in part on acknowledgment feedback for at least the first set of group-common semi-persistent downlink shared channels being multiplexed with one or more acknowledgment feedback indications for respective downlink shared channels.

Aspect 27: The method of aspect 26, wherein the acknowledgment feedback for at least the first set of group-common semi-persistent downlink shared channels is appended after the one or more acknowledgment feedback indications in the acknowledgment feedback message.

Aspect 28: The method of any of aspects 26 through 27, wherein the one or more acknowledgment feedback indications for respective downlink shared channels comprise acknowledgment feedback for a dynamic group-common downlink shared channel, for a first release message to release a configuration for a set of semi-persistent group-common downlink shared channels, for a set of unicast downlink shared channel, for a unicast dynamic downlink shared channel, for a second release message to release a set of downlink shared channels, or a combination thereof.

Aspect 29: The method of any of aspects 18 through 28, wherein receiving the acknowledgment feedback message comprises: receiving the acknowledgment feedback message based at least in part on a hybrid automatic repeat request process identifier for at least the first set of group-common semi-persistent downlink shared channels that is based at least in part on a set of parameters configured for a semi-persistent scheduling configuration corresponding to the first set of group-common semi-persistent downlink shared channels.

Aspect 30: The method of aspect 29, wherein the set of parameters comprises a configured scheduling radio network temporary identifier, a periodicity, a number of hybrid automatic repeat request processes, a hybrid automatic repeat request process identifier offset, or a combination thereof, configured for the semi-persistent scheduling configuration.

Aspect 31: The method of any of aspects 29 through 30, wherein the set of parameters are based at least in part on a group radio network temporary identifier configured for the one or more UEs.

Aspect 32: The method of any of aspects 18 through 31, wherein transmitting the acknowledgment feedback configuration comprises: transmitting a configuration for the plurality of UEs to transmit either acknowledgment feedback for a set of unicast semi-persistent downlink shared channels or acknowledgment feedback for a set of group-common semi-persistent downlink shared channels in a same uplink control channel.

Aspect 33: The method of any of aspects 18 through 32, wherein transmitting the acknowledgment feedback configuration comprises: transmitting a dropping configuration for the plurality of UEs to drop a first acknowledgment feedback message for a set of unicast semi-persistent downlink shared channels or a second acknowledgment feedback message for a set of group-common semi-persistent downlink shared channels based at least in part on the first acknowledgment feedback message and the second acknowledgment feedback message overlapping in a same transmission time interval.

Aspect 34: The method of any of aspects 18 through 33, wherein transmitting the acknowledgment feedback configuration comprises: transmitting a multiplexing configuration for the plurality of UEs to multiplex acknowledgment feedback for the one or more sets of unicast semi-persistent downlink shared channels and for the one or more sets of group-common semi-persistent downlink shared channels in a same uplink control channel.

Aspect 35: An apparatus for wireless communications at a UE, comprising a processor; memory coupled with the processor; and instructions stored in the memory and executable by the processor to cause the apparatus to perform a method of any of aspects 1 through 17.

Aspect 36: An apparatus for wireless communications at a UE, comprising at least one means for performing a method of any of aspects 1 through 17.

Aspect 37: A non-transitory computer-readable medium storing code for wireless communications at a UE, the code comprising instructions executable by a processor to perform a method of any of aspects 1 through 17.

Aspect 38: An apparatus for wireless communications at a base station, comprising a processor; memory coupled with the processor; and instructions stored in the memory and executable by the processor to cause the apparatus to perform a method of any of aspects 18 through 34.

Aspect 39: An apparatus for wireless communications at a base station, comprising at least one means for performing a method of any of aspects 18 through 34.

Aspect 40: A non-transitory computer-readable medium storing code for wireless communications at a base station, the code comprising instructions executable by a processor to perform a method of any of aspects 18 through 34.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a base station, an acknowledgment feedback configuration for providing feedback for a plurality of downlink shared channels configured for semi-persistent scheduling, the plurality of downlink shared channels configured for semi-persistent scheduling comprising one or more sets of unicast semi-persistent downlink shared channels and one or more sets of group-common semi-persistent downlink shared channels, the acknowledgment feedback configuration comprising either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels;
   monitoring for at least a first set of group-common semi-persistent downlink shared channels of the plurality of downlink shared channels configured for semi-persistent scheduling; and
   transmitting, to the base station and in accordance with the acknowledgment feedback configuration, an acknowledgment feedback message for at least the first set of group-common semi-persistent downlink shared channels based at least in part on the monitoring.

2. The method of claim 1, wherein receiving the acknowledgment feedback configuration comprises:
   receiving a first list of uplink control channel resources for transmitting acknowledgment feedback for the one or more sets of unicast semi-persistent downlink shared channels; and
   receiving a second list of uplink control channel resources for transmitting acknowledgment feedback for the one or more sets of group-common semi-persistent downlink shared channels, the second list being different than the first list.

3. The method of claim 2, further comprising:
   determining a first uplink control channel resource from the second list to transmit the acknowledgment feedback message based at least in part on a payload size of the acknowledgment feedback message.

4. The method of claim 1, wherein receiving the acknowledgment feedback configuration comprises:
   receiving a common list of uplink control channel resources for transmitting acknowledgment feedback for the one or more sets of unicast semi-persistent downlink shared channels and for the one or more sets of group-common semi-persistent downlink shared channels.

5. The method of claim 4, further comprising:
   determining a first uplink control channel resource from the common list to transmit the acknowledgment feedback message based at least in part on a payload size of the acknowledgment feedback message.

6. The method of claim 4, wherein a size of the common list is different than a size of a list of uplink control channel resources configured for transmitting acknowledgment feedback for the one or more sets of unicast semi-persistent downlink shared channels.

7. The method of claim 1, further comprising:
   determining a number of bits to transmit in the acknowledgment feedback message based at least in part on whether acknowledgment feedback for a dynamic downlink shared channel is to be transmitted at a same time as the acknowledgment feedback message for one or more semi-persistent downlink shared channels.

8. The method of claim 1, further comprising:
   determining an acknowledgment codebook for transmitting the acknowledgment feedback message based at least in part on a first order of slots per configuration index of the one or more sets of group-common semi-persistent downlink shared channels in a same serving cell, a second order of configuration indexes of the one or more sets of group-common semi-persistent downlink shared channels in a same serving cell, a third order of serving cell indexes, or a combination thereof.

9. The method of claim 1, wherein transmitting the acknowledgment feedback message comprises:
   transmitting the acknowledgment feedback message based at least in part on multiplexing acknowledgment feedback for at least the first set of group-common semi-persistent downlink shared channels with one or more acknowledgment feedback indications for respective downlink shared channels.

10. The method of claim 9, wherein the acknowledgment feedback for at least the first set of group-common semi-persistent downlink shared channels is appended after the one or more acknowledgment feedback indications in the acknowledgment feedback message.

11. The method of claim 9, wherein the one or more acknowledgment feedback indications for respective downlink shared channels comprise acknowledgment feedback for a dynamic group-common downlink shared channel, for a first release message to release a configuration for a set of semi-persistent group-common downlink shared channels, for a set of unicast downlink shared channel, for a unicast dynamic downlink shared channel, for a second release message to release a set of downlink shared channels, or a combination thereof.

12. The method of claim 1, further comprising:
determining a hybrid automatic repeat request process identifier for transmitting the acknowledgment feedback message for at least the first set of group-common semi-persistent downlink shared channels based at least in part on a set of parameters configured for a semi-persistent scheduling configuration corresponding to the first set of group-common semi-persistent downlink shared channels.

13. The method of claim 12, wherein the set of parameters comprises a configured scheduling radio network temporary identifier, a periodicity, a number of hybrid automatic repeat request processes, a hybrid automatic repeat request process identifier offset, or a combination thereof, configured for the semi-persistent scheduling configuration.

14. The method of claim 12, wherein the set of parameters are determined based at least in part on a group radio network temporary identifier configured for a group of UEs comprising the UE.

15. The method of claim 1, wherein receiving the acknowledgment feedback configuration comprises:
receiving a configuration for transmitting either acknowledgment feedback for a set of unicast semi-persistent downlink shared channels or acknowledgment feedback for a set of group-common semi-persistent downlink shared channels in a same uplink control channel.

16. The method of claim 1, wherein receiving the acknowledgment feedback configuration comprises:
receiving a dropping configuration for dropping a first acknowledgment feedback message for a set of unicast semi-persistent downlink shared channels or a second acknowledgment feedback message for a set of group-common semi-persistent downlink shared channels based at least in part on the first acknowledgment feedback message and the second acknowledgment feedback message overlapping in a same transmission time interval.

17. The method of claim 1, wherein receiving the acknowledgment feedback configuration comprises:
receiving a multiplexing configuration for multiplexing acknowledgment feedback for the one or more sets of unicast semi-persistent downlink shared channels and for the one or more sets of group-common semi-persistent downlink shared channels in a same uplink control channel.

18. A method for wireless communications at a base station, comprising:
transmitting, to one or more user equipment (UEs), an acknowledgment feedback configuration for providing feedback for a plurality of downlink shared channels configured for semi-persistent scheduling, the plurality of downlink shared channels configured for semi-persistent scheduling comprising one or more sets of unicast semi-persistent downlink shared channels and one or more sets of group-common semi-persistent downlink shared channels, the acknowledgment feedback configuration comprising either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels;
transmitting, to at least a first UE of the one or more UEs, at least a first set of group-common semi-persistent downlink shared channels of the plurality of downlink shared channels configured for semi-persistent scheduling; and
receiving, from at least the first UE according to the acknowledgment feedback configuration, an acknowledgment feedback message for at least the first set of group-common semi-persistent downlink shared channels based at least in part on the transmitting at least the first set of group-common semi-persistent downlink shared channels.

19. The method of claim 18, wherein transmitting the acknowledgment feedback configuration comprises:
transmitting a first list of uplink control channel resources for the one or more UEs to transmit acknowledgment feedback for the one or more sets of unicast semi-persistent downlink shared channels; and
transmitting a second list of uplink control channel resources for the one or more UEs to transmit acknowledgment feedback for the one or more sets of group-common semi-persistent downlink shared channels, the second list being different than the first list.

20. The method of claim 19, wherein receiving the acknowledgment feedback message comprises:
receiving the acknowledgment feedback message via a first uplink control channel resource from the second list based at least in part on a payload size of the acknowledgment feedback message.

21. The method of claim 18, wherein transmitting the acknowledgment feedback configuration comprises:
transmitting a common list of uplink control channel resources for the one or more UEs to transmit acknowledgment feedback for the one or more sets of unicast semi-persistent downlink shared channels and for the one or more sets of group-common semi-persistent downlink shared channels.

22. The method of claim 21, wherein receiving the acknowledgment feedback message comprises:
receiving the acknowledgment feedback message via a first uplink control channel resource from the common list based at least in part on a payload size of the acknowledgment feedback message.

23. The method of claim 18, wherein receiving the acknowledgment feedback message comprises:
receiving the acknowledgment feedback message comprising a number of bits based at least in part on whether acknowledgment feedback for a dynamic downlink shared channel is received with the acknowledgment feedback message.

24. The method of claim 18, wherein receiving the acknowledgment feedback message comprises:
receiving the acknowledgment feedback message according to an acknowledgment codebook that is based at least in part on an first order of slots per configuration index of the one or more sets of group-common semi-persistent downlink shared channels in a same serving cell, a second order of configuration indexes of the one or more sets of group-common semi-persistent downlink shared channels in a same serving cell, a third order of serving cell indexes, or a combination thereof.

25. The method of claim 18, wherein receiving the acknowledgment feedback message comprises:
receiving the acknowledgment feedback message based at least in part on acknowledgment feedback for at least the first set of group-common semi-persistent downlink shared channels being multiplexed with one or more acknowledgment feedback indications for respective downlink shared channels.

26. The method of claim 18, wherein receiving the acknowledgment feedback message comprises:
receiving the acknowledgment feedback message based at least in part on a hybrid automatic repeat request process identifier for at least the first set of group-common semi-persistent downlink shared channels that is based at least in part on a set of parameters configured for a semi-persistent scheduling configuration corresponding to the first set of group-common semi-persistent downlink shared channels.

27. The method of claim 18, wherein transmitting the acknowledgment feedback configuration comprises:
transmitting a configuration for the plurality of UEs to transmit either acknowledgment feedback for a set of unicast semi-persistent downlink shared channels or acknowledgment feedback for a set of group-common semi-persistent downlink shared channels in a same uplink control channel.

28. The method of claim 18, wherein transmitting the acknowledgment feedback configuration comprises:
transmitting a dropping configuration for the plurality of UEs to drop a first acknowledgment feedback message for a set of unicast semi-persistent downlink shared channels or a second acknowledgment feedback message for a set of group-common semi-persistent downlink shared channels based at least in part on the first acknowledgment feedback message and the second acknowledgment feedback message overlapping in a same transmission time interval.

29. An apparatus for wireless communications at a user equipment (UE), comprising:
a processor;
memory coupled with the processor; and
instructions stored in the memory and executable by the processor to cause the apparatus to:
receive, from a base station, an acknowledgment feedback configuration for providing feedback for a plurality of downlink shared channels configured for semi-persistent scheduling, the plurality of downlink shared channels configured for semi-persistent scheduling comprising one or more sets of unicast semi-persistent downlink shared channels and one or more sets of group-common semi-persistent downlink shared channels, the acknowledgment feedback configuration comprising either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels;
monitor for at least a first set of group-common semi-persistent downlink shared channels of the plurality of downlink shared channels configured for semi-persistent scheduling; and
transmit, to the base station and in accordance with the acknowledgment feedback configuration, an acknowledgment feedback message for at least the first set of group-common semi-persistent downlink shared channels based at least in part on the monitoring.

30. An apparatus for wireless communications at a base station, comprising:
a processor;
memory coupled with the processor; and
instructions stored in the memory and executable by the processor to cause the apparatus to:
transmit, to one or more user equipment (UEs), an acknowledgment feedback configuration for providing feedback for a plurality of downlink shared channels configured for semi-persistent scheduling, the plurality of downlink shared channels configured for semi-persistent scheduling comprising one or more sets of unicast semi-persistent downlink shared channels and one or more sets of group-common semi-persistent downlink shared channels, the acknowledgment feedback configuration comprising either separate resources for providing feedback for unicast semi-persistent downlink shared channels and group-common semi-persistent downlink shared channels, or common resources for providing feedback for both unicast semi-persistent downlink shared channels and group-common semi-persistent downlink shared channels;
transmit, to at least a first UE of the one or more UEs, at least a first set of group-common semi-persistent downlink shared channels of the plurality of downlink shared channels configured for semi-persistent scheduling; and
receive, from at least the first UE according to the acknowledgment feedback configuration, an acknowledgment feedback message for at least the first set of group-common semi-persistent downlink shared channels based at least in part on the transmitting at least the first set of group-common semi-persistent downlink shared channels.

\* \* \* \* \*